US009030561B2

(12) United States Patent
Sato

(10) Patent No.: US 9,030,561 B2
(45) Date of Patent: May 12, 2015

(54) IMAGE CALIBRATION METHOD AND IMAGE CALIBRATION DEVICE

(75) Inventor: Keiji Sato, Saitama (JP)

(73) Assignee: Clarion Co., Ltd., Saitama (JP)

( * ) Notice: Subject to any disclaimer, the term of this patent is extended or adjusted under 35 U.S.C. 154(b) by 357 days.

(21) Appl. No.: 13/807,440

(22) PCT Filed: Jun. 29, 2011

(86) PCT No.: PCT/JP2011/064873

§ 371 (c)(1),
(2), (4) Date: Dec. 28, 2012

(87) PCT Pub. No.: WO2012/002415

PCT Pub. Date: Jan. 5, 2012

(65) Prior Publication Data

US 2013/0100290 A1    Apr. 25, 2013

(30) Foreign Application Priority Data

Jun. 29, 2010  (JP) ................................. 2010-147128

(51) Int. Cl.
*H04N 7/18*        (2006.01)
*H04N 5/357*    (2011.01)
(Continued)

(52) U.S. Cl.
CPC ............. *H04N 7/181* (2013.01); *H04N 5/3572* (2013.01); *H04N 17/002* (2013.01); *G06T 7/0018* (2013.01); *G06T 2207/30204* (2013.01); *G06T 2207/30252* (2013.01); *G06T 3/00* (2013.01)

(58) Field of Classification Search
USPC ......................................................... 348/146
See application file for complete search history.

(56) References Cited

U.S. PATENT DOCUMENTS 7,307,655 B1    12/2007 Okamoto et al.

2004/0105579 A1* 6/2004 Ishii et al. .................... 382/154
(Continued)

FOREIGN PATENT DOCUMENTS

JP    2001-245326    9/2001
JP    2006-148745    6/2006
(Continued)

OTHER PUBLICATIONS

International Search Report issued Oct. 4, 2011 in International (PCT) Application No. PCT/JP2011/064873.

*Primary Examiner* — Tracy Li
(74) *Attorney, Agent, or Firm* — Wenderoth, Lind & Ponack, L.L.P.

(57) ABSTRACT

To alleviate the strictness degree required for a relative positional relationship between a calibration index and a vehicle in an image calibration method and an image calibration device. The image calibration device includes a calibration index 20, four cameras 10, a distortion correction processing unit 30, a viewpoint transformation processing unit 40, and a calibration processing unit 50. The calibration index 20 includes two mutually parallel lines and a distance between which is known and one line orthogonal to the two lines. The cameras 10 take peripheral area images S1 to S4 of peripheral areas R1 to R4 including the calibration index 20. The distortion correction processing unit 30 corrects the peripheral area images S1 to S4 by using internal parameters M to obtain distortion-corrected images P1 to P4. The viewpoint transformation processing unit 40 performs viewpoint transformation processing on the distortion-corrected images P1 to P4 by using external parameters N to obtain a viewpoint-transformed composite image Q0. The calibration processing unit 50 performs calibration in the viewpoint transformation processing. The calibration processing unit 50 includes an internal parameter correction unit 51 and an external parameter correction unit 52. The internal parameter correction unit 51 corrects the internal parameters M. The external parameter correction unit 52 corrects the external parameters N.

10 Claims, 13 Drawing Sheets

(51) Int. Cl.
*H04N 17/00* (2006.01)
*G06T 7/00* (2006.01)
*G06T 3/00* (2006.01)

(56) References Cited

U.S. PATENT DOCUMENTS

| | | | |
|---|---|---|---|
| 2006/0017807 A1* | 1/2006 | Lee et al. | 348/36 |
| 2006/0291698 A1* | 12/2006 | Oizumi | 382/104 |
| 2007/0009137 A1* | 1/2007 | Miyoshi et al. | 382/104 |
| 2007/0041659 A1* | 2/2007 | Nobori et al. | 382/284 |
| 2008/0031514 A1 | 2/2008 | Kakinami | |
| 2010/0001881 A1* | 1/2010 | Sugie et al. | 340/932.2 |
| 2010/0194853 A1* | 8/2010 | Matsusaka et al. | 348/36 |
| 2011/0199491 A1* | 8/2011 | Jikihira et al. | 348/188 |

FOREIGN PATENT DOCUMENTS

| | | |
|---|---|---|
| JP | 2010-103730 | 5/2010 |
| WO | 00/07373 | 10/2000 |

\* cited by examiner

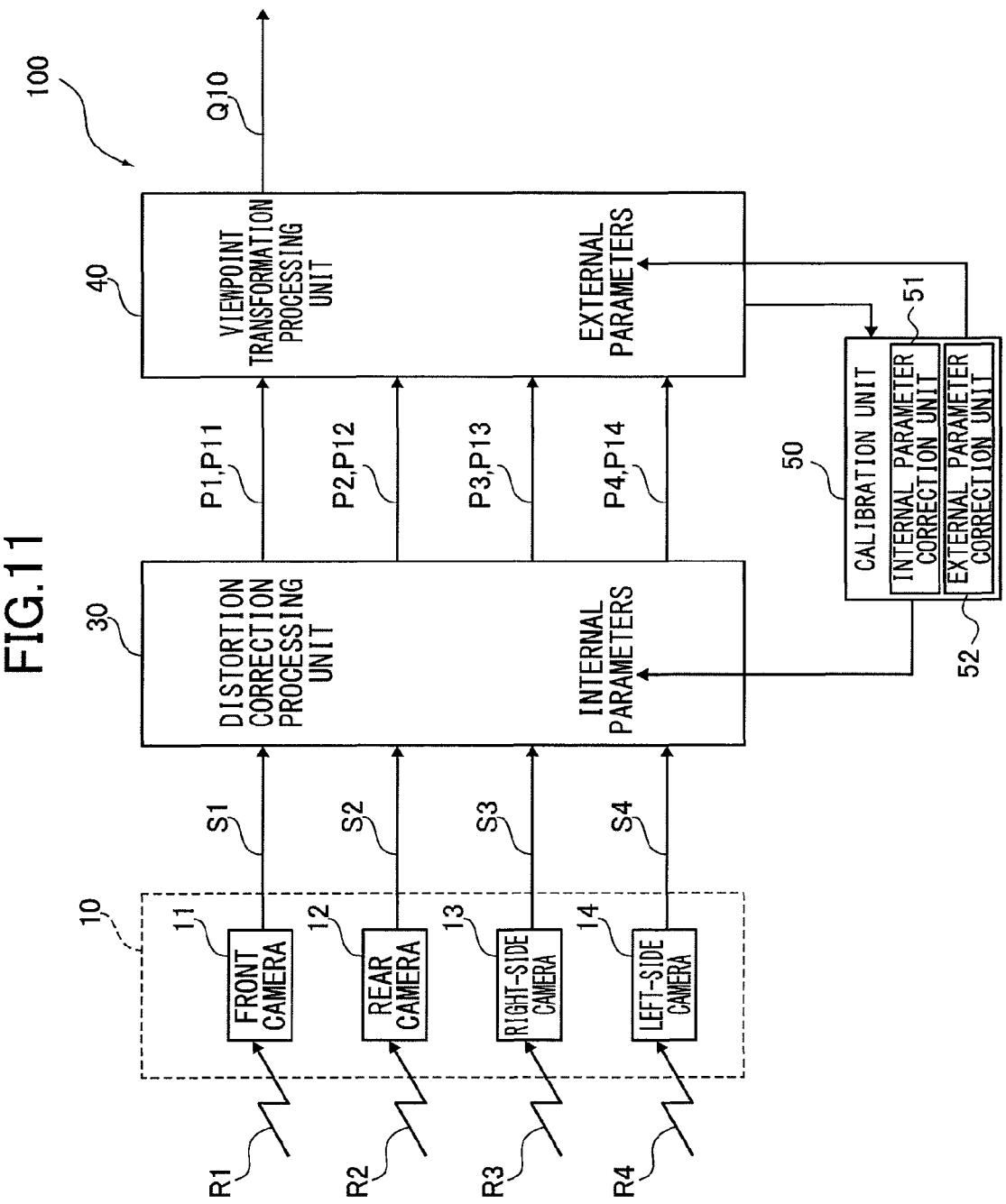

IMAGE CALIBRATION METHOD AND IMAGE CALIBRATION DEVICE

TECHNICAL FIELD

The present invention relates to an image calibration method and an image calibration device, and particularly relates to improvement of processing of transforming images around a vehicle taken by on-vehicle cameras into a single viewpoint-transformed composite image.

BACKGROUND ART

There is a technique to improve visibility at the time when the vehicle moves backward. In the technique, by displaying an image behind a vehicle taken by an on-vehicle camera on an on-vehicle monitor, a state just close to a place behind a vehicle which is a blind spot for the driver is observed as an image displayed on the on-vehicle monitor.

For displaying such an image of the on-vehicle camera, there is a technique for calibrating a state of attachment of the on-vehicle camera to the vehicle. For the calibration, a calibration index is provided behind the vehicle, and the driver views an image of the calibration index displayed on the on-vehicle monitor, and thereby simultaneously adjusts the state of attachment of the on-vehicle camera so that the image of the calibration index can be appropriately displayed.

In addition, there is a technique to appropriately calibrate an image displayed on the on-vehicle monitor by performing certain computation on the image obtained using the on-vehicle camera based on the image of the calibration index (Patent Document 1).

Moreover, there is another technique to be performed in the following manner. Multiple on-vehicle cameras take images of places all around the vehicle, multiple images obtained by the on-vehicle cameras are transformed into such images (bird's-eye view images) as being looked down from directly above the vehicle, and mapping is performed while relative locations of the images are adjusted. Then, a single viewpoint-transformed composite image is obtained (see Patent Document 2).

The above cases require accurate positioning of two adjacent images relative to each other, thus requiring highly accurate calibration.

PRIOR ART DOCUMENTS

Patent Documents

PATENT DOCUMENT 1: Japanese Patent Application Publication No. 2001-245326
PATENT DOCUMENT 2: International Patent Application Publication No. 00/07373 Pamphlet

SUMMARY OF THE INVENTION

Problem to be Solved by the Invention

However, in the conventional calibration methods, a relative positional relationship between the calibration index and the vehicle needs to be set strictly. The calibration index needs to be placed accurately with respect to the vehicle after the vehicle is arranged, or the vehicle needs to be arranged accurately with respect to the vehicle after the calibration index is placed.

In this respect, vehicle manufacturing line facility is improved at high costs, and thus is devised to improve the accuracy of positioning between the vehicle and the calibration index. Further, in a case where the calibration is again performed in a maintenance department of a sales and service company after the on-vehicle camera is shipped from a manufacturing site (in a case of repairing or in a case of attaching the on-vehicle camera or the like to the vehicle after shipping), the calibration index needs to be placed accurately every time the calibration is performed. Thus, further labor is required.

The present invention has been made in view of the above circumstances. An object of the present invention is to provide a calibration method and an image calibration device which are capable of alleviating the degree of strictness required for a relative positional relationship between a calibration index placed on a road surface and a vehicle arranged on the road surface.

Means for Solving the Problem

The image calibration method and an image calibration device according to the present invention alleviate the degree of strictness required for the relative positional relationship between the calibration index placed on the road surface and the vehicle arranged on the road surface in the following manner. Specifically, among multiple lines provided as a calibration index on the road surface, multiple on-vehicle cameras respectively take images of at least two lines and at least one line orthogonal to the two parallel lines which are mutually parallel and a distance between which is known. Distortion correction is performed on the obtained images by using default internal parameters. Correction of adjusting the internal parameters is performed so that each of images of lines in the calibration index in the thus obtained distortion-corrected images (or a viewpoint-transformed composite image to be described later) by the distortion correction can form a straight line. New distortion-corrected images obtained by the corrected internal parameters are transformed into a single viewpoint-transformed composite image by using default external parameters. The external parameters are corrected so that, like the lines in the actual calibration index: images of some of the lines in the calibration index in the viewpoint-transformed composite image can be parallel to each other; images of some of the lines can be orthogonal to each other; a distance between the parallel lines can coincide with that in the actual calibration index; and the same line (arranged on a straight line) in mutually different images which corresponds to one of the lines in the calibration index can be located on a straight line.

That is, a first image calibration method of the present invention is an image calibration method including taking peripheral area images of peripheral areas of a vehicle respectively with multiple cameras installed on the vehicle, the peripheral areas including a calibration index provided in advance on a road surface on which the vehicle is arranged, performing distortion correction on the peripheral area images respectively taken by the cameras on the basis of internal parameters according to optical characteristics of the cameras (for example, deviation between an optical axis of an image sensor of an on-vehicle camera and an optical axis of a lens, distortion (aberration or the like) of an image formed by a lens (an image imaged by an image sensor), or the like), performing viewpoint transformation processing on multiple distortion-corrected images obtained by the distortion correction on the basis of external parameters according to states of attachment of the cameras to the vehicle (the relative positional relationship of the vehicle (three-dimensional space coordinate position), and posture (an angle of an optical axis around each axis in three dimensions)), the viewpoint transformation processing being performed so that the multiple distortion-corrected images can be processed into a single viewpoint-transformed composite image obtained when the vehicle is looked down from above the vehicle (for example, a bird's-eye view image as being looked vertically down from a position above the vehicle), and calibrating the viewpoint-transformed composite image by adjusting the external parameters on the basis of an image of the calibration index in the viewpoint-transformed composite image, in the viewpoint transformation processing. The image calibration method is characterized as follows. The calibration index includes at least two lines which are mutually parallel and a distance between which is known and at least one line orthogonal to each of the two lines, and is formed so that each of the peripheral area images can include at least images corresponding to the two mutually parallel lines and an image corresponding to the one line orthogonal to each of the two lines and so that among the lines included in the calibration index, at least one line located in a shooting range of one of the cameras and at least one line located in a shooting range of a different one of the cameras can be located on a straight line. For each of the multiple distortion-corrected images, correction of adjusting the internal parameters is performed so that images corresponding to the two mutually parallel lines and an image corresponding to the one orthogonal line included in the distortion-corrected image can extend linearly. A new viewpoint-transformed composite image is obtained by using new distortion-corrected images obtained by using the corrected internal parameters. The correction of adjusting the external parameters is performed so that the new viewpoint-transformed composite image thus obtained can satisfy the following conditions (1) to (4):

(1) the images corresponding to the two mutually parallel lines are mutually parallel;
(2) a distance between the images corresponding to the two mutually parallel lines is the known distance between the lines in the calibration index;
(3) the image corresponding to the one orthogonal line is orthogonal to the images corresponding to the two parallel lines; and
(4) images corresponding to the line located on the straight line in the calibration index are located on a straight line.

Note that a calibration index or the like at least including, specifically for example, a first line, a second line, a third line, a fourth line, a fifth line, and a sixth line all of which are straight lines can be applied to the calibration index, the first line being placed in front of the vehicle and extending a vehicle width direction, the second line being placed behind the vehicle and extending in the vehicle width direction, the third line and the fourth line being placed in such a manner as to approximately evenly divide a space between the first line and the second line into three sections and extending in the vehicle width direction, the fifth line and the sixth line being placed at both sides of the vehicle and extending in a vehicle front-rear direction.

However, the calibration index in the first image calibration method of the present invention is not limited to the calibration index in this mode, and only has to be one provided in such a manner that each vehicle-periphery image includes at least images corresponding to at least two mutually parallel lines and an image corresponding to each of the two lines.

With the thus configured first image calibration method according to the present invention, the multiple cameras installed on the vehicle respectively take the multiple peripheral area images of the peripheral areas of the vehicle, the peripheral area image including the calibration index provided in advance on the road surface on which the vehicle is arranged. The distortion correction is performed on the peripheral area images respectively taken by the cameras, on the basis of the default internal parameters. The viewpoint transformation processing is performed on the multiple distortion-corrected images obtained by the distortion correction on the basis of the external parameters so that the multiple distortion-corrected images can be processed into the single viewpoint-transformed composite image. In the viewpoint transformation processing, the viewpoint-transformed composite image is calibrated by adjusting the external parameters on the basis of the images of the calibration index in the viewpoint-transformed composite image.

Meanwhile, distortion-corrected images reflect the internal parameters. In a conventional distortion correction, a default value (a common value in defiance of individual differences) which is a design value has been used as each of the internal parameters.

However, in the first image calibration method of the present invention, the internal parameters are corrected for each of the distortion-corrected images obtained by using the internal parameters of default values, so that each image of the line in the calibration index in the distortion-corrected image can form the straight line. Thus, it is possible to perform distortion correction appropriate for variation in the optical characteristics of the individual cameras and the individual differences.

Further, a viewpoint-transformed composite image based on the default external parameters is generated by using new distortion-corrected images (each image of the line in the calibration index forms the straight line) obtained based on the internal parameters thus corrected. Since the viewpoint-transformed composite image has the high accuracy distortion corrected images from which the viewpoint-transformed composite image is generated, and thus the viewpoint-transformed composite image necessarily has high accuracy.

Still further, the external parameters are corrected so that the viewpoint-transformed composite image can satisfy the aforementioned four conditions (1) to (4), and thereby a viewpoint-transformed composite image having further higher accuracy can be obtained.

Moreover, the aforementioned four conditions (1) to (4) do not depend on the relative positional relationship between the vehicle and the calibration index, and defines by nature the relationship (the parallelism, the orthogonality, the distance between the lines, and the linearity) only among the images of the lines in the viewpoint-transformed composite image. Thus, the strictness of the position of the vehicle or the posture (the direction) of the vehicle with respect to the calibration index at the time of arranging the vehicle with respect to the calibration index is not required.

That is, the relative positional relationship between the calibration index placed on the road surface and the vehicle arranged on the road surface only has to have accuracy (to a degree of practical level of deviation) of the position and the posture of the vehicle obtained in an ordinary operation of parking in a parking frame in a general parking lot or the like. Thus, the degree of strictness required for the relative positional relationship can be alleviated.

This means that even if the vehicle is of a different type (the size or shape of the vehicle), the calibration index common thereto can be used without any modification. Thus, a calibration index dedicated for the type of the vehicle does not have to be prepared and to be placed every time calibration is performed, and labor and time of the work can be considerably reduced.

Note that in the first image calibration method of the present invention, whether or not the images corresponding to the two mutually parallel lines in each distortion-corrected image and the image corresponding to the one line orthogonal to the two lines extend linearly can be determined in the following manner. Specifically, parts of each image are made thin lines by an image processing technique, for example. Then, if differential values (inclinations) of each line at appropriate intervals approximately fall within a certain range, the line can be determined as a straight line.

In the first image calibration method of the present invention, the internal parameters are corrected for the distortion-corrected images so that each image of the corresponding line can form a straight line. In contrast in a second image calibration method of the present invention to be described later, the internal parameters are corrected for the viewpoint-transformed composite image so that the image of the corresponding line can form a straight line.

Note that it can be said that a longer image of a line results in higher accuracy reliability in correcting the image of the line to obtain a straight line.

In this respect, since the images of the lines in each distortion-corrected image taken by the corresponding camera are longer than the images of the lines in the viewpoint-transformed composite image, the accuracy reliability is higher in correcting each internal parameter so that the images of the lines in the distortion-corrected image can form the straight lines than in the case of correcting each internal parameter so that the images of the lines in the viewpoint-transformed composite image can form the straight lines.

Thus, the first image calibration method of the present invention can provide calibration having higher accuracy reliability than the second image calibration method of the present invention to be described later.

Further, each image of the corresponding line in the distortion-corrected image for the camera has more pixels corresponding to the image than an image of the line in the corresponding image in the viewpoint-transformed composite image, regardless of whether the image in the distortion-corrected image is longer or not. Thus, correcting the accuracy reliability is higher in correcting each internal parameter so that the image of the line in the distortion-corrected image can form a straight line than in the case of correcting the internal parameter so that the image of the line in the viewpoint-transformed composite image can form a straight line.

Also learned from this, the first image calibration method of the present invention can provide calibration having higher accuracy reliability than the second image calibration method of the present invention to be described later.

Meanwhile, there is a case where the internal parameters for simultaneously changing images of all the lines into straight lines do not necessarily exist. In such a case, what is required is to correct the internal parameters by comprehensively evaluate (to obtain such a state that the linearity is ensured in the best balance as a whole) the linearity of the images of all the lines.

For the new viewpoint-transformed composite image generated based on the new distortion-corrected images in a state after the internal parameters are corrected, that is, a state in which the images of the lines in the calibration index extend linearly, the external parameters are corrected so that the images corresponding to the mutually parallel lines in the calibration index can be mutually parallel in the viewpoint-transformed composite image, so that the distance between the images corresponding to the mutually parallel lines in the viewpoint-transformed composite image can be the known distance between the lines in the calibration index, so that the images corresponding to the mutually orthogonal lines in the calibration index can be mutually orthogonal in the viewpoint-transformed composite image, and so that the images corresponding to the line located on a straight line in the calibration index can be located on a straight line. Whether or not the images in the viewpoint-transformed composite image are parallel can be determined based on whether or not inclinations (differential values) of the images (approximately linear portions) corresponding to the lines coincide with each other. In addition, whether or not the images are orthogonal to each other can be determined based on whether or not a value of the product of the inclinations of the images corresponding to the lines is "−1" (when corresponding portions of the images are expressed in vectors, based on whether or not a value of the inner product thereof is "0").

Note that there is also a case where the external parameters cannot be adjusted to those by which corresponding images become in a completely parallel state (in a state where inclination values are exactly identical) or in a completely orthogonal state (a value of the product of inclinations is exactly "−1"). In such a case, what is required is to adjust the external parameters by comprehensively evaluate (to obtain such a state that the parallelism and the linearity is ensured in the best balance as a whole) the aforementioned parallelism and the linearity.

Moreover, whether or not the images in the viewpoint-transformed composite image corresponding to the line located on a straight line in the calibration index are located on the straight line can be determined based on whether or not the inclinations of the images coincide with an intercept x (or an intercept y) at the time when the lines are expressed in the two-dimensional Cartesian system defined by the x axis and the y axis (orthogonal to the x axis).

As described above, with the first image calibration method according to the present invention, the internal parameters are adjusted so that the images in the distortion-corrected images corresponding to the calibration index can extend linearly. Thereby, it is possible to achieve higher accuracy calibration than the conventional calibration in which the fixed internal parameter is used and the external parameter is adjusted.

Moreover, with the first image calibration method according to the present invention, the calibration index is formed by the lines in comparison with the conventional calibration method performed only based on points. Thus, the accuracy can be improved more than in the conventional calibration in which distortions between the points are not considered.

In addition, the at least two lines which are parallel and the distance between which is known and the at least one line orthogonal to these two lines are applied to the lines described above, and thereby the external parameters are adjusted based on the parallelism degree and the orthogonality degree of the images in the viewpoint-transformed composite image, based on the distance between the images (the lines), and so that the images corresponding to the lines located on a straight line which are overlappingly shown in the multiple images can be located on a straight line. Thus, highly accurate calibration can be performed all over the viewpoint-transformed composite image.

In the first image calibration method of the present invention, the internal parameters are corrected based on the linearity of the images in each distortion-corrected image. In contrast, in the second image calibration method of the present invention, the internal parameters are corrected based on the linearity of the images of the lines in the calibration index in the viewpoint-transformed composite image, instead of the distortion-corrected image.

That is, the second image calibration method of the present invention is an image calibration method including: taking peripheral area images of peripheral areas of a vehicle respectively with multiple cameras installed on the vehicle, the peripheral areas including a calibration index provided in advance on a road surface on which the vehicle is arranged, performing distortion correction on the peripheral area images respectively taken by the cameras on the basis of internal parameters according to optical characteristics of the cameras, performing viewpoint transformation processing on multiple distortion-corrected images obtained by the distortion correction on the basis of external parameters according to states of attachment of the cameras to the vehicle, the viewpoint transformation processing being performed so that the multiple distortion-corrected images can be processed into a single viewpoint-transformed composite image obtained when the vehicle is looked down from above the vehicle, and calibrating the viewpoint-transformed composite image by adjusting the external parameters on the basis of an image of the calibration index in the viewpoint-transformed composite image, in the viewpoint transformation processing. The image calibration method is characterized as follows. The calibration index includes at least two lines which are mutually parallel and a distance between which is known and at least one line orthogonal to each of the two lines, and is formed so that each of the peripheral area images can include at least images corresponding to the two mutually parallel lines and an image corresponding to the one line orthogonal to each of the two lines and so that among the lines included in the calibration index, at least one line located in a shooting range of one of the cameras and at least one line located in a shooting range of a different one of the cameras can be located on a straight line. For the viewpoint-transformed composite image, correction of adjusting the internal parameters is performed so that images corresponding to the two mutually parallel lines and an image corresponding to the one orthogonal line included in the distortion-corrected image can extend linearly. The viewpoint-transformed composite image is obtained by using new distortion-corrected images obtained by using the corrected internal parameters. The correction of adjusting the external parameters is performed so that the new viewpoint-transformed composite image thus obtained can satisfy the following conditions (1) to (4):
(1) the images corresponding to the two mutually parallel lines are mutually parallel;
(2) a distance between the images corresponding to the two mutually parallel lines is the known distance between the lines in the calibration index;
(3) the image corresponding to the one orthogonal line is orthogonal to the images corresponding to the two parallel lines; and
(4) images corresponding to the line located on the straight line in the calibration index are located on a straight line.

The thus configured second image calibration method according to the present invention can provide the same operation and effect as those in the aforementioned first image calibration method of the present invention.

However, as has been described about the first image calibration method of the present invention, the first image calibration method in which the internal parameters are corrected based on the linearity of the images in each distortion-corrected image can have higher image linearity accuracy than the second image calibration method in which the internal parameters are corrected based on the linearity of the images in the viewpoint-transformed composite image, and thus can have enhanced accuracy of the internal parameters.

A first image calibration device of the present invention is a device for implementing the first image calibration method of the present invention. The image calibration device includes a calibration index provided in advance on a road surface on which a vehicle is arranged, multiple cameras installed on the vehicle which take peripheral area images of peripheral areas of the vehicle, the peripheral areas including the calibration index, a distortion correction device for performing distortion correction on the peripheral area images respectively taken by the cameras, on the basis of internal parameters according to optical characteristics of the cameras, a viewpoint transformation processing device for performing viewpoint transformation processing on multiple distortion-corrected images obtained by the distortion correction on the basis of external parameters according to states of attachment of the cameras to the vehicle, the viewpoint transformation processing being performed so that the multiple distortion-corrected images can be processed into a single viewpoint-transformed composite image obtained when being looked down from above the vehicle, and a calibration device for calibrating the viewpoint-transformed composite image by adjusting the external parameters on the basis of images of the calibration index in the viewpoint-transformed composite image, in the viewpoint transformation processing performed by the viewpoint transformation processing device. The image calibration device is characterized as follows. The calibration index includes at least two lines which are mutually parallel and a distance between which is known and at least one line orthogonal to each of the two lines, and is formed so that each of the vehicle-periphery images can include at least images corresponding to the two mutually parallel lines and an image corresponding to the one line orthogonal to each of the two lines, and so that among the lines included in the calibration index, at least one line located in a shooting range of one of the cameras and at least one line located in a shooting range of a different one of the cameras can be located on a straight line. The calibration device includes an internal parameter correction device and an external parameter correction device. The internal parameter correction device performs correction of adjusting the internal parameters for the viewpoint-transformed composite image so that images corresponding to the two mutually parallel lines and an image corresponding to the one orthogonal line included in the viewpoint-transformed composite image can extend linearly. When a new viewpoint-transformed composite image is obtained by using new distortion-corrected images obtained by the distortion correction device by using the corrected internal parameters, the external parameter correction device performs correction of adjusting the external parameters so that the new viewpoint-transformed composite image thus obtained can satisfy the following conditions (1) to (4):
(1) the images corresponding to the two mutually parallel lines are mutually parallel;
(2) a distance between the images corresponding to the two mutually parallel lines is the known distance between the lines in the calibration index;
(3) the image corresponding to the one orthogonal line is orthogonal to the images corresponding to the two parallel lines; and
(4) images corresponding to the line located on the straight line in the calibration index are located on a straight line.

With the thus configured first image calibration device according to the present invention, the multiple cameras installed on the vehicle take the multiple peripheral area images of the peripheral areas of the vehicle including the calibration index, the distortion correction device performs the distortion correction on the peripheral area images respectively taken by the cameras on the basis of the default internal parameters. The viewpoint transformation processing device performs the viewpoint transformation processing on the multiple distortion-corrected images obtained by the distortion correction on the basis of the external parameters, so that the multiple distortion-corrected images can be processed into the single viewpoint-transformed composite image. The calibration device calibrates the viewpoint-transformed composite image by adjusting the external parameters on the basis of the images of the calibration index in the viewpoint-transformed composite image, in the viewpoint transformation processing performed by the viewpoint transformation processing device.

In addition, for each of the multiple distortion-corrected images, the internal parameter correction device of the calibration device performs the correction of adjusting the internal parameter so that the images corresponding to the two mutually parallel lines included in the distortion-corrected image and the image corresponding to the one orthogonal line can extend linearly.

Further, when obtaining the new viewpoint-transformed composite image by using the new distortion-corrected images obtained by the distortion correction device by using the corrected internal parameters, the external parameter correction device of the calibration device performs correction of adjusting the external parameters so that the new viewpoint-transformed composite image thus obtained can satisfy the aforementioned conditions (1) to (4).

As described above, with the first image calibration device according to the present invention, the internal parameters are adjusted so that the images in the distortion-corrected images corresponding to the calibration index can extend linearly. Thereby, it is possible to achieve higher accuracy calibration than the conventional calibration in which the fixed internal parameter is used and the external parameter is adjusted.

Moreover, with the first image calibration device according to the present invention, the calibration index is formed by the lines in comparison with the conventional calibration device using only points. Thus, it is possible to improve the accuracy than in the conventional calibration in which distortion between the points is not considered.

In addition, the at least two lines which are parallel and the distance between which is known and the at least one line orthogonal to these two lines are applied to the lines described above, and thereby the external parameters are adjusted based on the parallelism degree and the orthogonality degree of the images in the viewpoint-transformed composite image, based on the distance between the images (the lines), and so that the images corresponding to the lines located on a straight line which are overlappingly shown in the multiple images can be located on a straight line. Thus, highly accurate calibration can be performed all over the viewpoint-transformed composite image.

The first image calibration device of the present invention corrects the internal parameters for the distortion-corrected images so that each image of the corresponding line can form a straight line. In contrast, a second image calibration device of the present invention to be described later corrects the internal parameters for the viewpoint-transformed composite image so that the image of the corresponding line can form a straight line.

Note that it can be said that a longer image of a line results in higher accuracy reliability in correcting the image of the line to obtain a straight line.

In this respect, since the images of the lines in each distortion-corrected image are longer than the images of the lines in the viewpoint-transformed composite image, the accuracy reliability is higher in correcting each internal parameter so that the images of the lines in the distortion-corrected image can form the straight lines than in the case of correcting each internal parameter so that the images of the lines in the viewpoint-transformed composite image can form the straight lines.

Thus, the first image calibration device of the present invention can provide calibration having higher accuracy reliability than the second image calibration device of the present invention to be described later.

The first image calibration device of the present invention corrects the internal parameters based on the linearity of the images in each distortion-corrected image. In contrast, the second image calibration device of the present invention corrects the internal parameters based on the linearity of the images of the lines in the calibration index in the viewpoint-transformed composite image, instead of the distortion-corrected image.

Specifically, the second image calibration device of the present invention is an image calibration device including a calibration index provided in advance on a road surface on which a vehicle is arranged, multiple cameras installed on the vehicle which take peripheral area images of peripheral areas of the vehicle, the peripheral areas including the calibration index, a distortion correction device for performing distortion correction on the peripheral area images respectively taken by the cameras on the basis of internal parameters according to optical characteristics of the cameras, a viewpoint transformation processing device for performing viewpoint transformation processing on multiple distortion-corrected images obtained by the distortion correction on the basis of external parameters according to states of attachment of the cameras to the vehicle, the viewpoint transformation processing being performed so that the multiple distortion-corrected images can be processed into a single viewpoint-transformed composite image obtained when being looked down from above the vehicle, and a calibration device for calibrating the viewpoint-transformed composite image by adjusting the external parameters on the basis of images of the calibration index in the viewpoint-transformed composite image, in the viewpoint transformation processing performed by the viewpoint transformation processing device. The image calibration device is characterized as follows. The calibration index includes at least two lines which are mutually parallel and a distance between which is known and at least one line orthogonal to each of the two lines, and is formed so that each of the peripheral area images can include at least images corresponding to the two mutually parallel lines and an image corresponding to the one line orthogonal to each of the two lines, and so that among the lines included in the calibration index, at least one line located in a shooting range of one of the cameras and at least one line located in a shooting range of a different one of the cameras can be located on a straight line. The calibration device includes an internal parameter correction device and an external parameter correction device. The internal parameter correction device performs correction of adjusting the internal parameters for the viewpoint-transformed composite image so that images corresponding to the two mutually parallel lines and an image corresponding to the one orthogonal line included in the viewpoint-transformed composite image can extend linearly. When a new viewpoint-transformed composite image is obtained by using new distortion-corrected images obtained by the distortion correction device by using the corrected internal parameters, the external parameter correction device performs correction of adjusting the external parameters so that the new viewpoint-transformed composite image thus obtained can satisfy the following conditions (1) to (4):

(1) the images corresponding to the two mutually parallel lines are mutually parallel;

(2) a distance between the images corresponding to the two mutually parallel lines is the known distance between the lines in the calibration index;

(3) the image corresponding to the one orthogonal line is orthogonal to the images corresponding to the two parallel lines; and (4) images corresponding to the line located on the straight line in the calibration index are located on a straight line.

With the thus configured second image calibration device according to the present invention, the multiple cameras installed on the vehicle take the multiple peripheral area images of the peripheral areas of the vehicle including the calibration index. The distortion correction device performs the distortion correction on the peripheral area images respectively taken by the cameras on the basis of the default internal parameters. The viewpoint transformation processing device performs the viewpoint transformation processing on the multiple distortion-corrected images obtained by the distortion correction on the basis of the external parameters so that the multiple distortion-corrected images can be processed into the single viewpoint-transformed composite image. The calibration device calibrates the viewpoint-transformed composite image by adjusting the external parameters on the basis of the images of the calibration index in the viewpoint-transformed composite image, in the viewpoint transformation processing performed by the viewpoint transformation processing device.

In addition, the internal parameter correction device of the calibration device performs the correction of adjusting the internal parameters for the viewpoint-transformed composite image so that the images corresponding to the two mutually parallel lines included in the viewpoint-transformed composite image and the image corresponding to the one orthogonal line can extend linearly.

Further, when obtaining the new viewpoint-transformed composite image by using the new distortion-corrected images obtained by the distortion correction device by using the corrected internal parameters, the external parameter correction device of the calibration device performs the correction of adjusting the external parameters so that the new viewpoint-transformed composite image thus obtained can satisfy the aforementioned conditions (1) to (4).

The thus configured second image calibration device according to the present invention can provide the same operation and effect as those in the aforementioned first image calibration device of the present invention.

However, as has been described about the first image calibration device of the present invention, the first image calibration device which corrects the internal parameters based on the linearity of the images in each distortion-corrected image can have higher image linearity accuracy than the second image calibration device which corrects the internal parameters based on the linearity of the images in the viewpoint-transformed composite image, and thus can have enhanced accuracy of the internal parameters.

Effect of the Invention

With the image calibration method and the image calibration device according to the present invention, it is possible to alleviate the degree of strictness required for a relative positional relationship between a calibration index placed on a road surface and a vehicle arranged on the road surface.

BRIEF DESCRIPTION OF THE DRAWINGS

FIG. 11 is a block diagram showing a schematic configuration of an image calibration device according to Embodiment 2 of the present invention.

MODES FOR CARRYING OUT THE INVENTION

Figure 1:
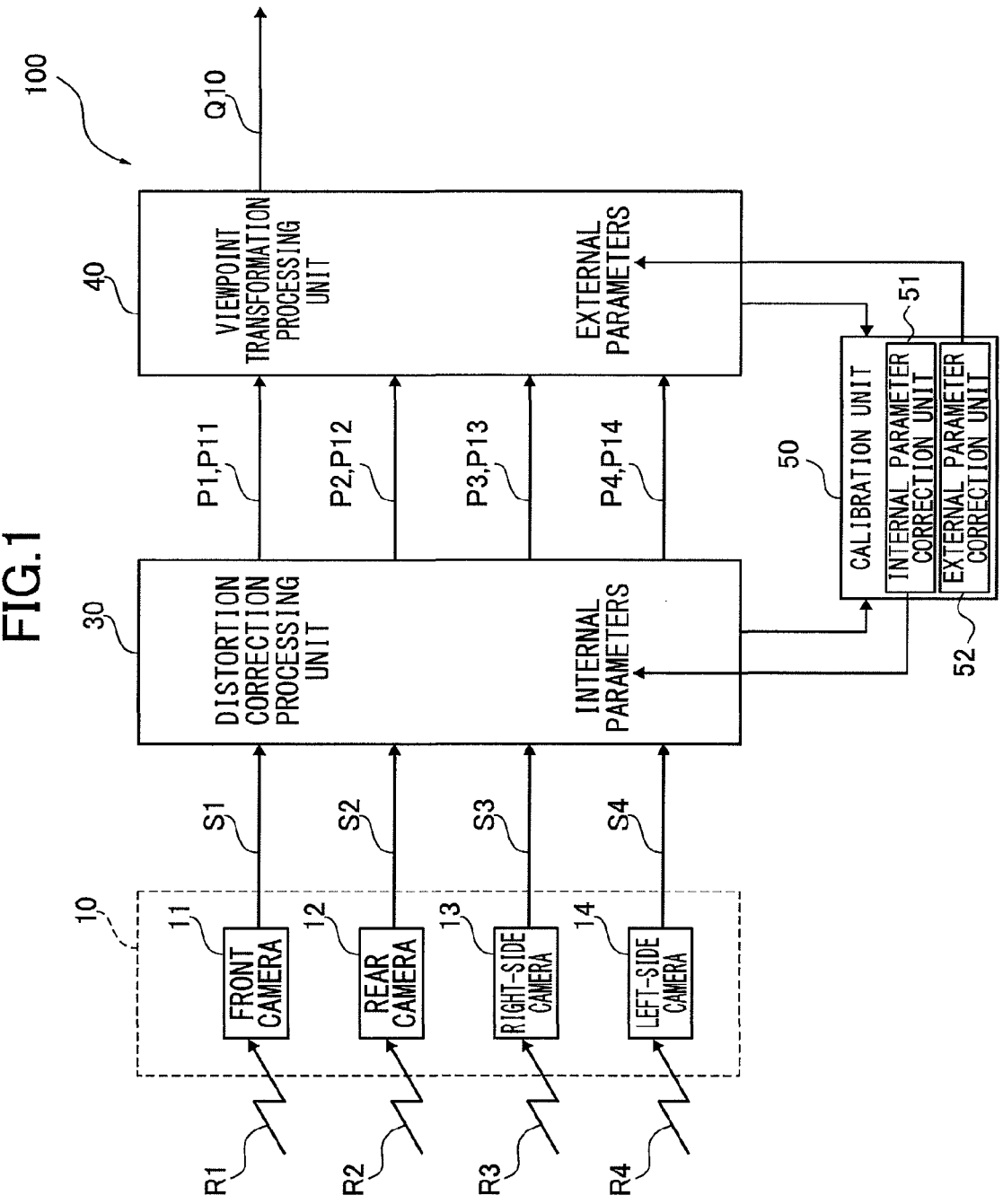
FIG. 1 is a block diagram showing a schematic configuration of an image calibration device according to Embodiment 1 of the present invention.

Hereinafter, embodiments of an image calibration device according to the present invention will be described by referring to the drawings.

Embodiment 1

FIG. 1 is a block diagram showing a configuration of an image calibration device 100 of one embodiment of the present invention.

Figure 4A:
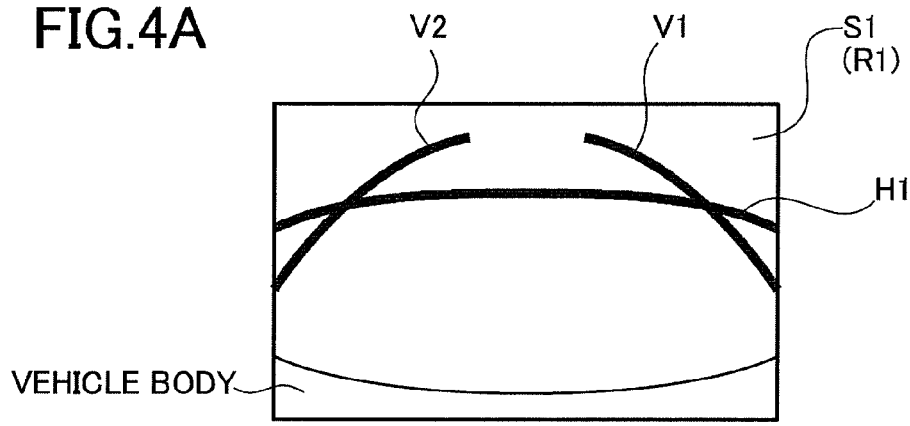
FIG. 4A is an image taken by a front camera among peripheral area images obtained by being taken by the cameras.
Figure 4B:
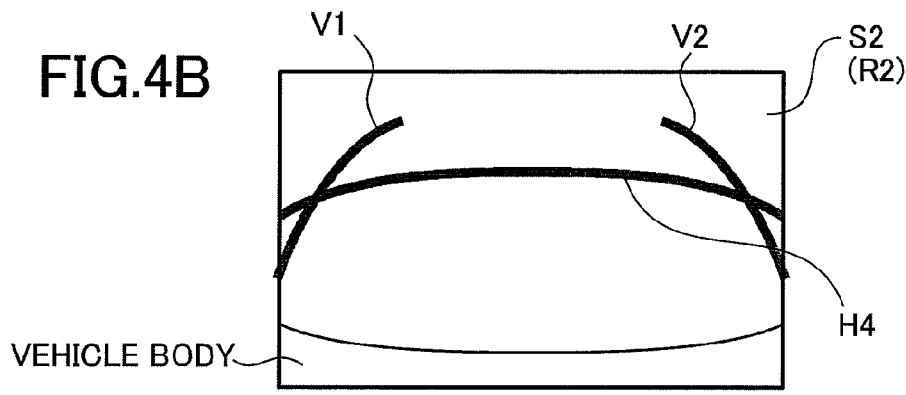
FIG. 4B is an image taken by a rear camera among the peripheral area images obtained by being taken by the cameras.
Figure 4C:
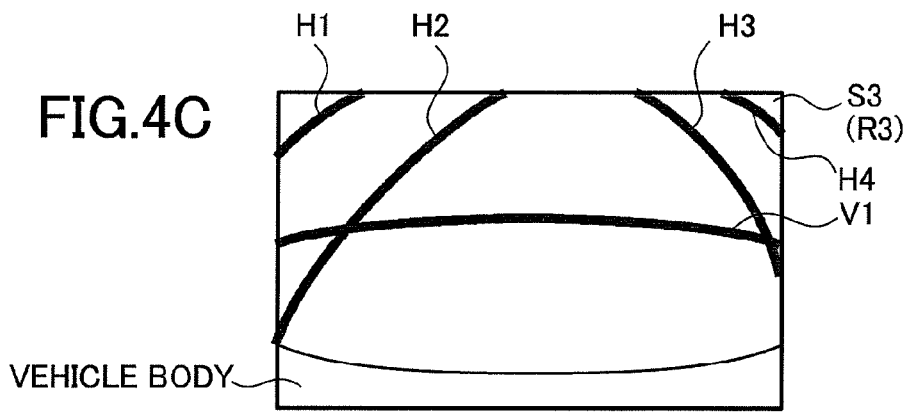
FIG. 4C is an image taken by a right-side camera among the peripheral area images obtained by being taken by the cameras.
Figure 4D:
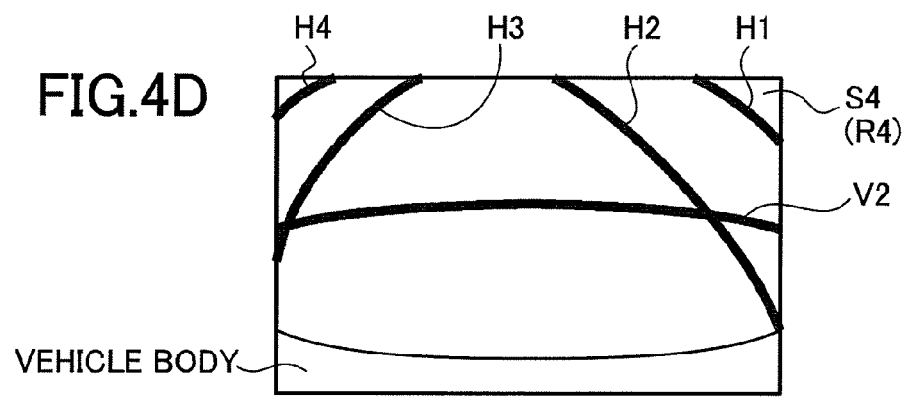
FIG. 4D is an image taken by a left-side camera among the peripheral area images obtained by being taken by the cameras.
Figure 5:
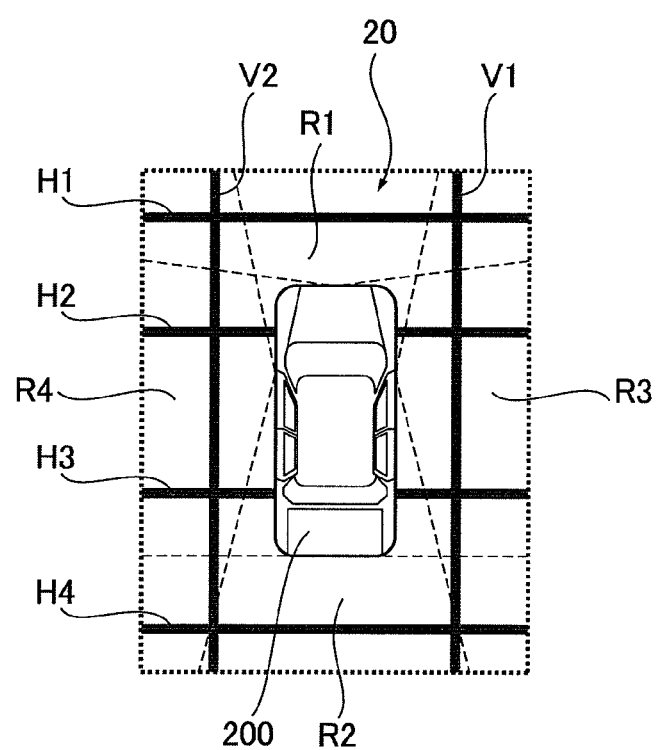
FIG. 5 is a diagram showing an example of a state where the vehicle shown in FIG. 2 is arranged on a road surface on which the calibration index shown in FIG. 3 is formed.
Figure 6A:
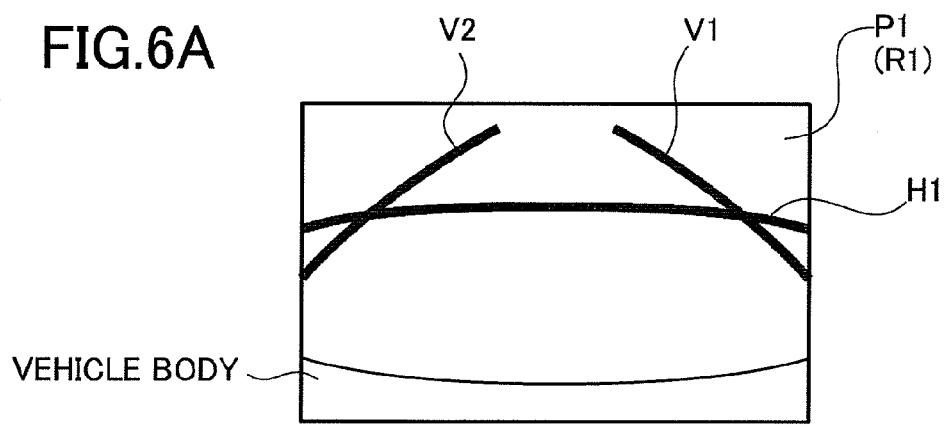
FIG. 6A is a distortion-corrected image corresponding to the front camera among distortion-corrected images obtained after distortion correction is performed on the peripheral area images by using default internal parameters.
Figure 6B:
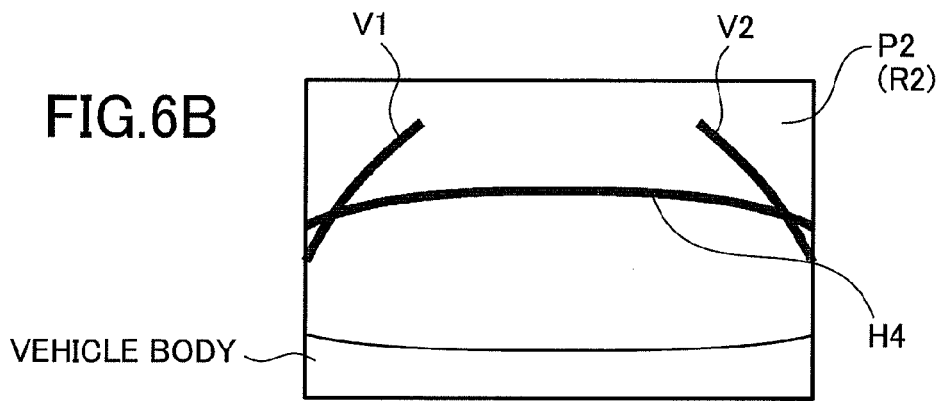
FIG. 6B is a distortion-corrected image corresponding to the rear camera among the distortion-corrected images obtained after the distortion correction is performed on the peripheral area images by using the default internal parameters.
Figure 6C:
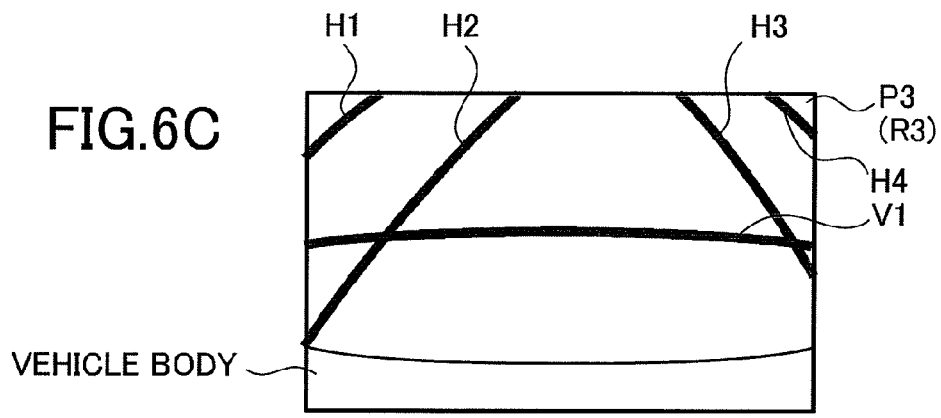
FIG. 6C is a distortion-corrected image corresponding to the right-side camera among the distortion-corrected images obtained after the distortion correction is performed on the peripheral area images by using the default internal parameters.
Figure 6D:
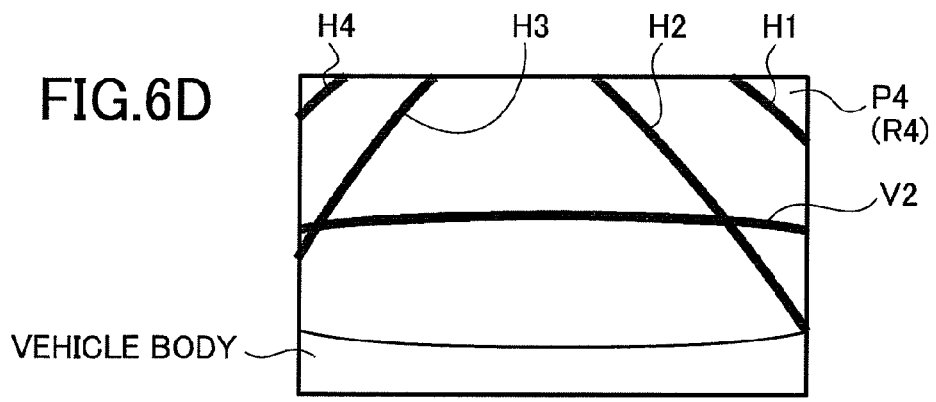
FIG. 6D is a distortion-corrected image corresponding to the left-side camera among the distortion-corrected images obtained after the distortion correction is performed on the peripheral area images by using the default internal parameters.
Figure 7A:
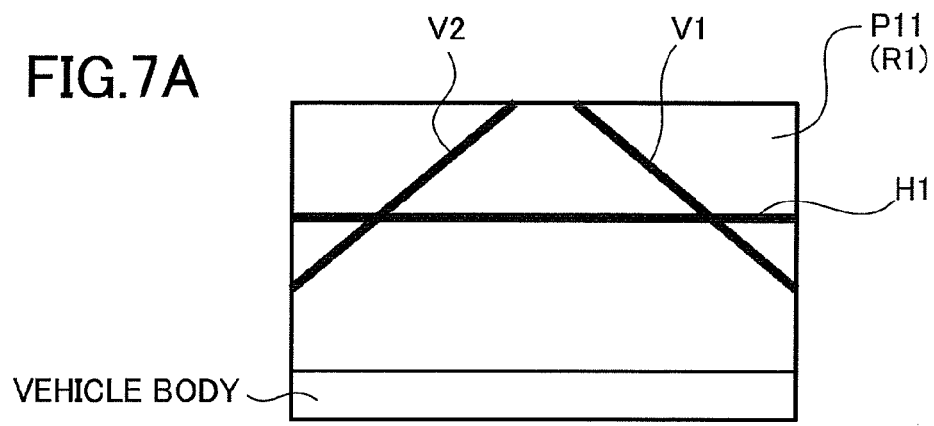
FIG. 7A is a distortion-corrected image corresponding to the front camera among the distortion-corrected images obtained after distortion correction is performed on the peripheral area images by using corrected internal parameters.
Figure 7B:
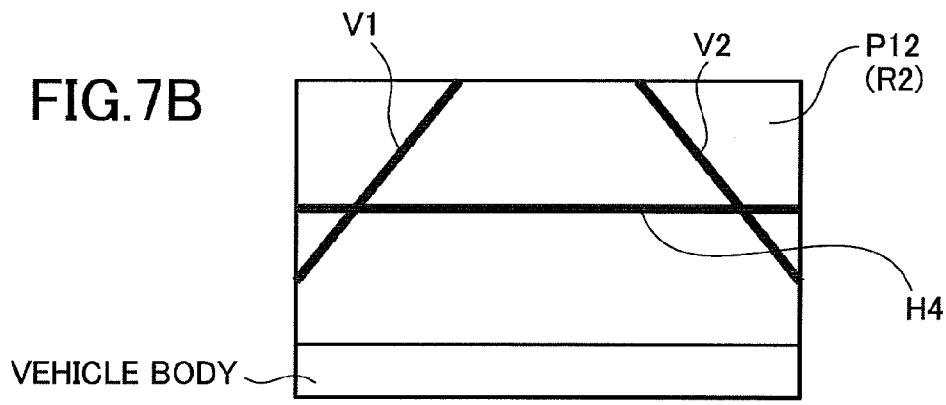
FIG. 7B is a distortion-corrected image corresponding to the rear camera among the distortion-corrected images obtained after the distortion correction is performed on the peripheral area images by using the corrected internal parameters.
Figure 7C:
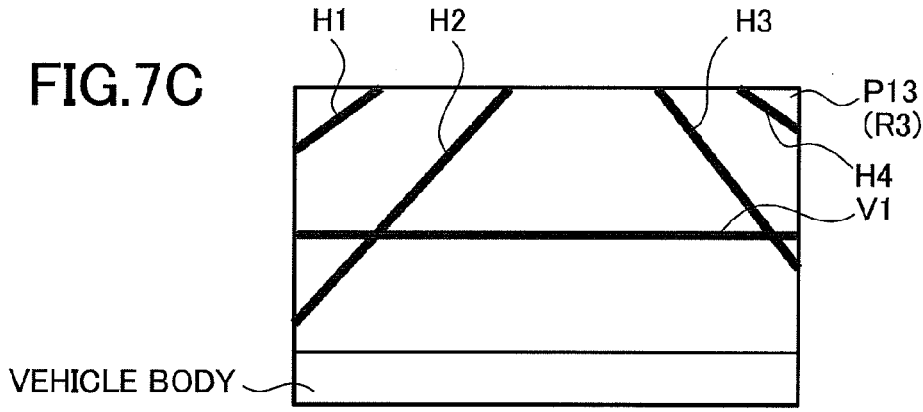
FIG. 7C is a distortion-corrected image corresponding to the right-side camera among the distortion-corrected images obtained after the distortion correction is performed on the peripheral area images by using the corrected internal parameters.
Figure 7D:
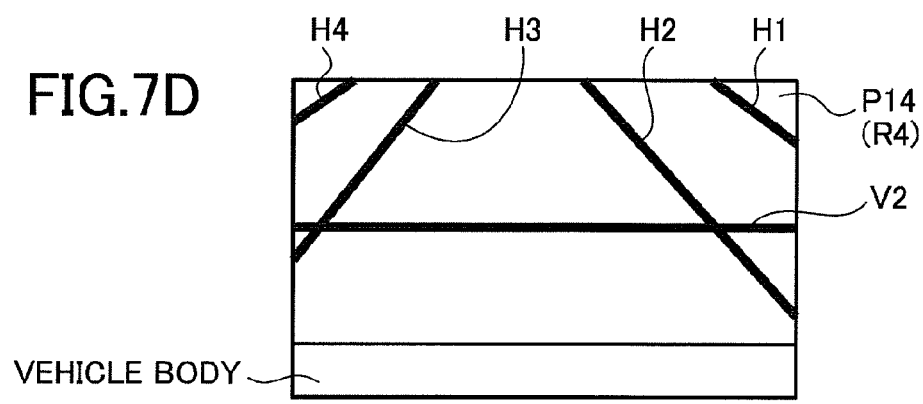
FIG. 7D is a distortion-corrected image corresponding to the left-side camera among the distortion-corrected images obtained after the distortion correction is performed on the peripheral area images by using the corrected internal parameters.

The calibration device 100 illustrated therein includes four cameras 10 (a front-portion (front) camera 11, a rear-portion (rear) camera 12, a right-side-portion (right-side) camera 13, and a left-side-portion (left-side) camera 14), a calibration index 20 (see FIG. 3) to be described later drawn in advance on a road surface on which a vehicle 200 is arranged (a state where the vehicle 200 is arranged on the road surface on which the calibration index 20 is placed is shown in FIG. 5), a distortion correction processing unit 30 (distortion correction processing device), a viewpoint transformation processing unit 40 (viewpoint transformation processing device), and a calibration unit 50 (calibration device). The cameras 10 are respectively installed on a front portion, a rear portion, a right-side portion, and a left-side portion of the vehicle 200, and take images of peripheral areas R1, R2, R3, and R4 (see FIG. 2) of the vehicle 200 as peripheral area images S1 (see FIG. 4A), S2 (see FIG. 4B), S3 (see FIG. 4C), and S4 (see FIG. 4D), respectively, the peripheral areas R1, R2, R3, and R4 including part of the vehicle 200 and the calibration index 20 shown in FIG. 3. For each of the peripheral area images S (the peripheral area image S1 obtained by taking an image of the peripheral area R1 (in front of the vehicle 200) by the front camera 11, the peripheral area image S2 obtained by taking an image of the peripheral area R2 (behind the vehicle 200) by the rear camera 12, the peripheral area image S3 obtained by taking an image of the peripheral area R3 (in an area on the right side of the vehicle 200) by the right-side camera 13, and the peripheral area image S4 obtained by taking an image of the peripheral area R4 (in an area on the left side of the vehicle 200) by the left-side camera 14), the distortion correction processing unit 30 performs distortion correction to remove distortion (such as aberration due to optical systems (such as lenses) included in the cameras 10) by using internal parameters M (an internal parameter M1 of the front camera 11, an internal parameter M2 of the rear camera 12, an internal parameter M3 of the right-side camera 13, and an internal parameter M4 of the left-side camera 14) according to optical characteristics of the respective cameras 11, 12, 13, and 14. The viewpoint transformation processing unit 40 performs view-point transformation processing on four distortion-corrected images P (a distortion-corrected image P1 corresponding to the peripheral area image S1, a distortion-corrected image P2 corresponding to the peripheral area image S2, a distortion-corrected image P3 corresponding to the peripheral area image S3, and a distortion-corrected image P4 corresponding to the peripheral area image S4) based on external parameters N (an external parameter N1 for the front camera 11, an external parameter N2 for the rear camera 12, an external parameter N3 for the right-side camera 13, and an external parameter N4 for the left-side camera 14) according to states of attachment of the cameras 10 to the vehicle 200 so that the four distortion-corrected images P can be processed into a single viewpoint-transformed composite image Q0 obtained by looking down the vehicle 200 from above. For the viewpoint transformation processing performed by the viewpoint transformation processing unit, the calibration unit 50 calibrates the viewpoint-transformed composite image Q0 by adjusting the external parameters N based on an image of the calibration index 20 in the viewpoint-transformed composite image Q0.

Figure 3:
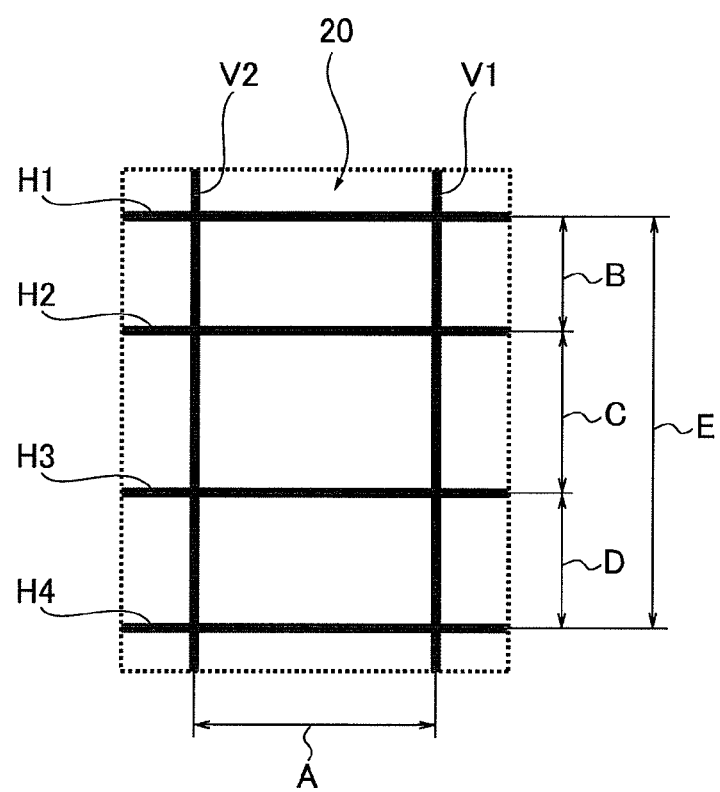
FIG. 3 is a diagram showing an example of a calibration index.

Note that, as shown in FIG. 3, for example, the calibration index 20 includes: a straight first horizontal line (a first line) H1 which is to be located in front of the vehicle 200 in the state where the vehicle 200 is arranged (FIG. 5) and extends in a width direction (a vehicle width direction) of the vehicle 200; a straight fourth horizontal line (a second line) H4 which is to be located behind the vehicle 200 and extends in the vehicle width direction; a second horizontal line (a fifth line) H2 and a third horizontal line (a sixth line) H3 which are straight, are to be located between the first horizontal line H1 and the fourth horizontal line H4, and extend in the vehicle width direction; a straight first vertical line (a third line) V1 which is to be located on the right side of the vehicle 200 and extends in a front-rear direction of the vehicle 200; and a straight second vertical line (a fourth line) V2 which is to be located on the left side of the vehicle 200 and extends in the front-rear direction of the vehicle 200.

In addition, the first horizontal line H1, the second horizontal line H2, the third horizontal line H3, and the fourth horizontal line H4 are parallel to each other. Moreover, a distance between the first horizontal line H1 and the second horizontal line H2 is set at a known distance B, a distance between the second horizontal line H2 and the third horizontal line H3 is set at a known distance C, a distance between the third horizontal line H3 and the fourth horizontal line H4 is set at a known distance D, and a distance between the first horizontal line H1 and the fourth horizontal line H4 is set at a known distance E.

Besides, the first vertical line V1 and the second vertical line V2 are also parallel to each other and orthogonal to the horizontal lines H1, H2, H3, and H4, and a distance between the first vertical line V1 and the second vertical line V2 is set at a known distance A.

In addition, the calibration index 20 is configured such that each of the peripheral area images S1, S2, S3, and S4 includes: ones of images H1, H2, H3, H4, V1, and V2 corresponding to at least two mutually parallel lines (two lines of the lines H1, H2, H3, and H4 or two lines of the lines V1 and V2) (the same reference numerals of the lines are used for reference numerals of the respective images to avoid complicatedness of the description, and the same applies heretofore); and one of the images V1, V2, H1, H2, H3, and H4 corresponding to one (one line of the lines V1 and V2 or one line of the lines H1, H2, H3, and H4) which is orthogonal to each of the two lines.

Specifically, the peripheral area image S1 shows: the images V1 and V2 of the two mutually parallel vertical lines V1 and V2 among the lines H1, H2, H3, H4, V1, and V2 of the calibration index 20; and the image H1 of the one horizontal line H1 orthogonal to each of the two vertical lines V1 and V2 (FIG. 4A).

Likewise, the peripheral area image S2 shows: the images V1 and V2 of the two mutually parallel vertical lines V1 and V2 among the lines H1, H2, H3, H4, V1, and V2 of the calibration index 20; and the image H4 of the one horizontal line H4 orthogonal to each of the two vertical lines V1 and V2 (FIG. 4B).

Likewise, the peripheral area image S3 shows: the images H2 and H3 of the two mutually parallel horizontal lines H2 and H3 among the lines H1, H2, H3, H4, V1, and V2 of the calibration index 20; and the image V1 of the one vertical line V1 orthogonal to each of the two horizontal lines H2 and H3 (FIG. 4C).

Likewise, the peripheral area image S4 shows: the images H2 and H3 of the two mutually parallel horizontal lines H2 and H3 among the lines H1, H2, H3, H4, V1, and V2 of the calibration index 20; and the image V2 of the one vertical line V2 orthogonal to each of the two horizontal lines H2 and H3 (FIG. 4D).

As a premise to satisfy a condition (4) to be described later, each of the peripheral area images S1, S2, S3, and S4 shows one of the images (V1, V2, H2, and H3) of the corresponding line (V1, V2, H2, and H3) which is also shown in a different one of the peripheral area images S1, S2, S3, and S4 and is located on a straight line in the calibration index 20 in reality.

In other words, the peripheral area image S1 shows: the image V1 of the line V1 which is shown in the different peripheral area images S2 and S3 and is located on a straight line in the calibration index 20 in reality; and the image V2 of the line V2 which is shown in the different peripheral area images S2 and S4 and is located on a straight line in the calibration index 20 in reality.

Likewise, the peripheral area image S2 shows: the image V1 of the line V1 which is shown in the different peripheral area images S1 and S3 and is located on a straight line in the calibration index 20 in reality; and the image V2 of the line V2 which is shown in the different peripheral area images S1 and S4 and is located on a straight line in the calibration index 20 in reality.

Furthermore, the peripheral area image S3 shows the image H1, the image H2, the image H3, and the image H4 of the respective line H1, the line H2, the line 113, and the line H4 which are shown in the different peripheral area image S4 and are located on straight lines in the calibration index 20 in reality. Note that the image H1 of the line H1 shown in the peripheral area image S3 is also shown in the different peripheral area image S1, and the image H4 of the line H4 is also shown in the different peripheral area image S2.

Likewise, the peripheral area image S4 shows the image H1, the image H2, the image H3, and the image H4 of the respective line H1, the line H2, the line H3, and the line H4 which are shown in the different peripheral area image S3 and are located on straight lines in the calibration index 20 in reality. Note that the image H1 of the line H1 shown in the peripheral area image S4 is also shown in the different peripheral area image S1, and the image H4 of the line H4 is also shown in the different peripheral area image S2.

The calibration unit 50 includes an internal parameter correction unit 51 (internal parameter correction device) and an external parameter correction unit 52 (external parameter correction device). For each of the four distortion-corrected images P1 to P4, the internal parameter correction unit 51 performs a correction to adjust a corresponding one of the internal parameters M so that images corresponding to two mutually parallel lines and an image corresponding to one line orthogonal to the mutually parallel lines can extend linearly, the images being included in the corresponding one of the distortion-corrected images P1 to P4. When a new viewpoint-transformed composite image Q10 is obtained by using new distortion-corrected images P11, P12, P13, and P14 (P11 denotes a new distortion-corrected image corresponding to the distortion-corrected image P1 based on a corresponding one of the default internal parameters M; P12, a new distortion-corrected image corresponding to the distortion-corrected image P2 based on a corresponding one of the default internal parameters M; P13, a new distortion-corrected image corresponding to the distortion-corrected image P3 based on a corresponding one of the default internal parameters M; and P14, a new distortion-corrected image corresponding to the distortion-corrected image P4 based on a corresponding one of the default internal parameters M) obtained by the distortion correction processing unit 30 by using the corrected internal parameters M, the external parameter correction unit 52 performs correction to adjust the external parameters N so that the new viewpoint-transformed composite image Q10 can satisfy the following conditions (1) to (4).

(1) The images corresponding to the two mutually parallel ones of the lines H1, H2, H3, and H4 or corresponding to the lines V1 and V2 are mutually parallel.

(2) A distance between images corresponding to the two mutually parallel ones of the lines H1, H2, H3, and H4 or corresponding to the lines V1 and V2 is a corresponding one of the known distances (A, B, C, D, and E) between the two lines in the calibration index 20.

(3) The image corresponding to the one orthogonal one of the lines V1 and V2 or one of the lines H1, H2, H3, and H4 is orthogonal to the images corresponding to the two parallel ones of the lines H1, H2, H3, and H4 or to the lines V1 and V2.

(4) Images corresponding to the line located on the straight line in the calibration index 20 are located on a straight line.

Next, a description is given of an operation of the calibration device 100 in this embodiment.

Figure 2:
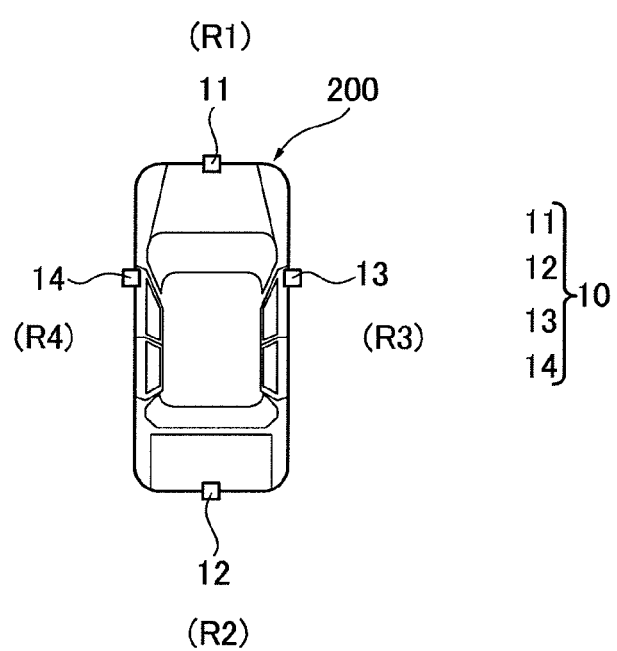
FIG. 2 is a schematic diagram showing a vehicle with four cameras mounted thereon.

Firstly, the vehicle 200 shown in FIG. 2 is arranged on the flat road surface on which the calibration index 20 shown in FIG. 3 is drawn in advance as shown in FIG. 5, the vehicle 200 having the front camera 11, the rear camera 12, the right-side camera 13, and the left-side camera 14 installed on the front, rear, right, and left portions of the vehicle 200, respectively.

Figure 10A:
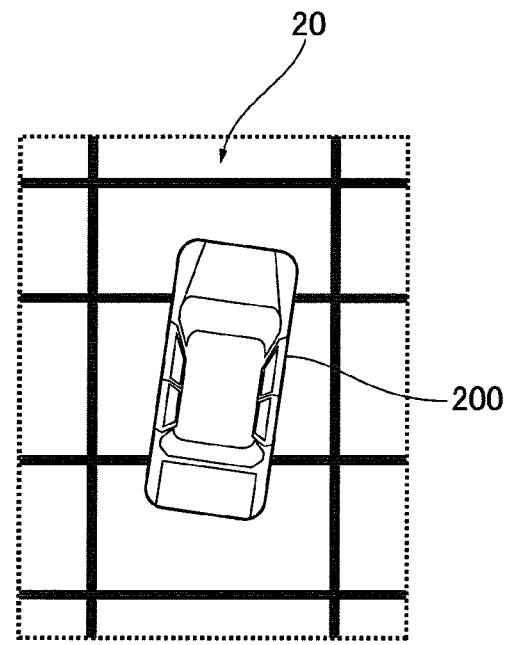
FIG. 10A is a schematic diagram showing a state where the vehicle is arranged in a posture not straightened with respect to the calibration index.
Figure 10B:
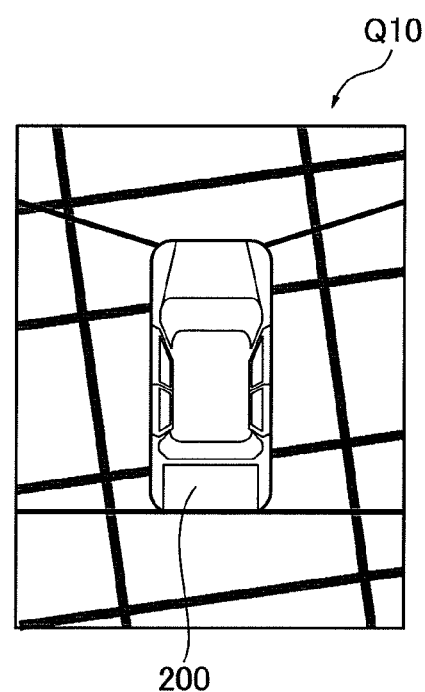
FIG. 10B is a diagram showing a synthesized bird's-eye view image obtained in the arrangement state in FIG. 10A.

In one state (a direction (a posture) and a location of the vehicle 200 with respect to the horizontal lines H and the vertical lines V of the calibration index 20) of arrangement of the vehicle 200 with respect to the calibration index 20, the vehicle 200 may be arranged in a straightened posture (a posture in which the front-rear direction of the vehicle 200 is parallel to the vertical lines V1 and V2 of the calibration index 20, and the width direction of the vehicle 200 is parallel to the horizontal lines H1, H2, H3, and H4 of the calibration index 20) on the center of the calibration index 20 as shown in FIG. 5, but may be arranged in an oblique posture with respect to the calibration index 20 as shown in FIG. 10A, for example. Likewise, the vehicle 200 may be arranged in a position deviated from the center of the calibration index 20.

In this embodiment, the description is given below for a case of the arrangement shown in FIG. 5. However, even in an arrangement state (for example, the arrangement state in FIG. 10A) other than this arrangement state, an operation and an effect exerted by the present invention are the same as those in the case of the arrangement state in FIG. 5.

In the state where the vehicle 200 is arranged on the calibration index 20 as shown in FIG. 5, the cameras 11, 12, 13, and 14 of the calibration device 100 take images of the peripheral areas R1, R2, R3, and R4 including part of the vehicle 200 and part of the calibration index 20. Thereby, the peripheral area images S1 (see FIG. 4A), S2 (see FIG. 4B), S3 (see FIG. 4C), and S4 (see FIG. 4D) corresponding to the peripheral areas R1, R2, R3, and R4, respectively, are obtained by the cameras 11, 12, 13, and 14.

The peripheral area images S1, S2, S3, and S4 obtained by the cameras 11, 12, 13, and 14 each include: the images V (or ones of the images H) corresponding to the at least two mutually parallel lines V (or ones of the lines H); and one of the images H (or the images V) corresponding to the at least one of the lines H (or the lines V) orthogonal to the mutually parallel lines V (or the lines H).

Specifically, the peripheral area image S1 shows the images V1 and V2 of the mutually parallel vertical lines V1 and V2 in the calibration index 20 and the image H1 of the one orthogonal horizontal line H1 (FIG. 4A). The peripheral area image S2 shows the images V1 and V2 of the mutually parallel vertical lines V1 and V2 in the calibration index 20 and the image H4 of the one orthogonal horizontal line H4 (FIG. 4B). The peripheral area image S3 shows the images H2 and H3 of the two mutually parallel horizontal lines H2 and H3 and the image V1 of the one orthogonal vertical line V1 (FIG. 4C). The peripheral area image S4 shows the images H2 and H3 of the two mutually parallel horizontal lines H2 and H3 and the image V2 of the one orthogonal vertical line V2 (FIG. 4D).

Meanwhile, it is more preferable that in each image of the peripheral area image S3 taken by the right-side camera 13 and the peripheral area image S4 taken by the left-side camera 14, the calibration index 20 should be set so that at least the line H2 and the line H3 can be taken symmetrically or that a default positional relationship between the vehicle 200 and the calibration index 20 should be set, because both the length of the line H2 and the length of the line H3 can be ensured to be long and the accuracy can be further enhanced in correction performed with ensured linearity to be described later. However, the lines H2 and H3 do not have to be necessarily symmetrical to each other in the corresponding image as illustrated in this embodiment.

The peripheral area images S1 to S4 are inputted in the distortion correction processing unit 30. The distortion correction processing unit 30 performs the distortion correction on the inputted peripheral area images S1 to S4 by using the default internal parameters M. Thereby, the peripheral area images S1, S2, S3, and S4 are the distortion-corrected images P1 to P4 on which distortions have been corrected to some extent as shown in FIGS. 6A to 6D.

Meanwhile, each of the default internal parameters M is a design value set uniformly in defiance of individual differences of the optical characteristics of the cameras 10. Thus, if the optical characteristics of the cameras 10 were ideal ones exactly identical to the design value, the distortion correction using the default internal parameters M would result in the distortion-corrected images P1, P2, P3, and P4 on which distortions thereof are completely corrected.

However, the cameras 10 in reality have the individual differences in the optical characteristics due to a design allowance or the like set with a manufacturing error taken into consideration.

Thus, the internal parameters M used for the distortion correction should be different from each other by nature according to the individual cameras 10.

However, since the distortion correction processing unit 30 firstly performs the distortion correction by using the default internal parameters M, the distortions have not been completely corrected in the obtained distortion-corrected images P1, P2, P3, and P4.

Hence, in the calibration device 100 in this embodiment, the internal parameter correction unit 51 of the calibration unit 50 corrects the default internal parameters M of the distortion correction processing unit 30.

The correction of each internal parameter M performed by the internal parameter correction unit 51 is processing in which the images H1, H2, H3, H4, V1, and V2 of the lines H1, H2, H3, H4, V1, and V2 in the calibration index 20 included in each distortion-corrected image S end up with images extending linearly as shown in FIG. 7 by serially changing a value of the internal parameter M by trial and error.

The corrected internal parameters are obtained from the internal parameters M1, M2, M3, and M4 corresponding to the respective cameras 11, 12, 13, and 14 at the time when the images H1, H2, H3, H4, V1, and V2 of the lines H1, H2, H3, H4, V1, and V2 in the calibration index 20 included in the distortion-corrected image S end up with images extending linearly.

That is, the internal parameters M1 to M4 are internal parameters respectively for the cameras 11 to 14 having individual differences in optical characteristics. The distortion correction processing unit 30 performs the distortion correction by using the internal parameters M1 to M4 for the respective cameras 11 to 14, and thereby the peripheral area images S1, S2, S3, and S4 turn into the distortion-corrected images P11, P12, P13, and P14 on which distortions thereof have been corrected accurately as shown in FIG. 7A, FIG. 7B, FIG. 7C, and FIG. 7D, respectively.

Next, the obtained distortion-corrected images P11 to P14 are inputted in the viewpoint transformation processing unit 40. The viewpoint transformation processing unit 40 performs the viewpoint transformation processing according to the default external parameters N on the inputted distortion-corrected images P11 to P14 to generate the single viewpoint-transformed composite image Q0 shown in FIG. 8.

Figure 8:
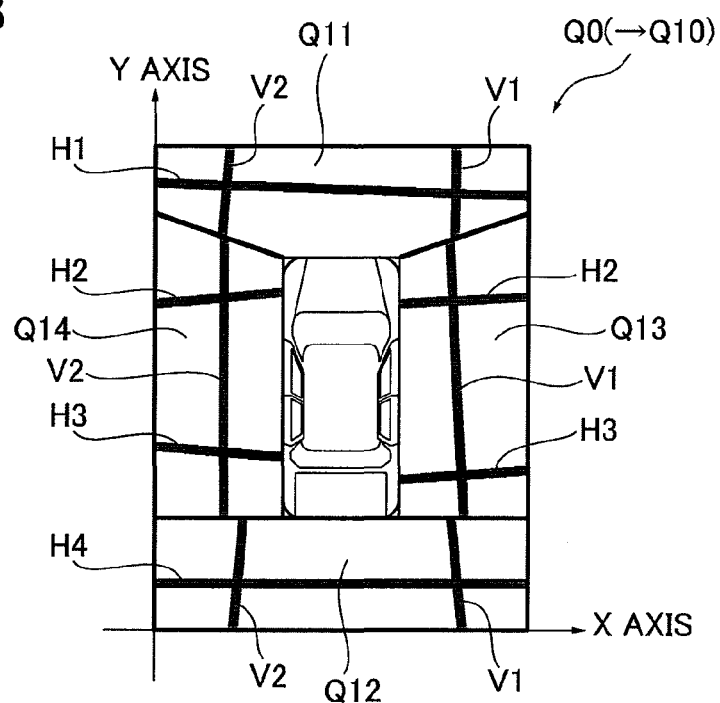
FIG. 8 is a diagram showing a viewpoint-transformed composite image on which view-point transformation processing is performed in a state where only the internal parameters are corrected and default external parameters are applied.

Note that in the viewpoint-transformed composite image Q0 in FIG. 8, a portion corresponding to the distortion-corrected image P11 is a viewpoint-transformed partial image Q11, a portion corresponding to the distortion-corrected image P12 is a viewpoint-transformed partial image Q12, a portion corresponding to the distortion-corrected image P13 is a viewpoint-transformed partial image Q13, and a portion corresponding to the distortion-corrected image P14 is a viewpoint-transformed partial image Q14.

At this time, the correction has been completed in each of the distortion-corrected images P11, P12, P13, and P14 so that the images H1, H2, H3, H4, V1, and V2 of the lines H1, H2, H3, H4, V1, and V2 of the calibration index 20 can have straight line shapes. Thus, the images H1, H2, H3, H4, V1, and V2 of the lines H1, H2, H3, H4, V1, and V2 of the calibration index 20 in each of the viewpoint-transformed partial images Q11 to Q14 generated based on the distortion-corrected images P11, P12, P13, and P14 also have straight line shapes.

Nevertheless, the default external parameters N used in the viewpoint transformation processing performed by the viewpoint transformation processing unit 40 are design values set uniformly in defiance of individual differences of states of the attachment of the cameras 10 with respect to the vehicle 200. Thus, if the states of the attachment of the cameras 10 were ideal ones exactly identical to the design values, the images H1, H2, H3, H4, V1, and V2 of the lines H1, H2, H3, H4, V1, and V2 of the calibration index 20 in the viewpoint-transformed composite image Q0 obtained by the viewpoint transformation processing using the default external parameters N would be parallel to each other and distances between the images of the lines would coincide with the known values (A, B, C, D, and E), or orthogonal to each other, like the lines H1, H2, H3, H4, V1, and V2 in the calibration index 20 in reality. In addition, each of the images H2, H3, V1, and V2 of the lines H2, H3, V1, and V2 overlappingly shown in the viewpoint-transformed partial images Q11 to Q14 should be located on a corresponding straight line.

However, the cameras 10 and the vehicle 200 in reality are each formed while having a design allowance or the like set with a manufacturing error taken into consideration, and thus naturally have individual differences in the states of the attachment of the cameras 10 to the vehicle 200, such as the attachment positions and the attachment postures.

Thus, the external parameters N used for the viewpoint transformation processing should be different from each other by nature according to the individual cameras 10.

However, the viewpoint transformation processing unit 40 firstly performs the distortion correction by using the default external parameters N. Thus, in the obtained viewpoint-transformed composite image Q0, the images H1, H2, H3, H4, V1, and V2 of the lines H1, H2, H3, H4, V1, and V2 included therein might not be parallel to each other, the distances between the images corresponding to the lines might not be appropriate, the images H1, H2, H3, H4, V1, and V2 might not be orthogonal to each other, or images of a line which should be on a straight line might not be on the straight line, as shown in FIG. 8.

Hence, in the calibration device 100 in this embodiment, the external parameter correction unit 52 of the calibration unit 50 corrects the default external parameters N of the viewpoint transformation processing unit 40.

Figure 9:
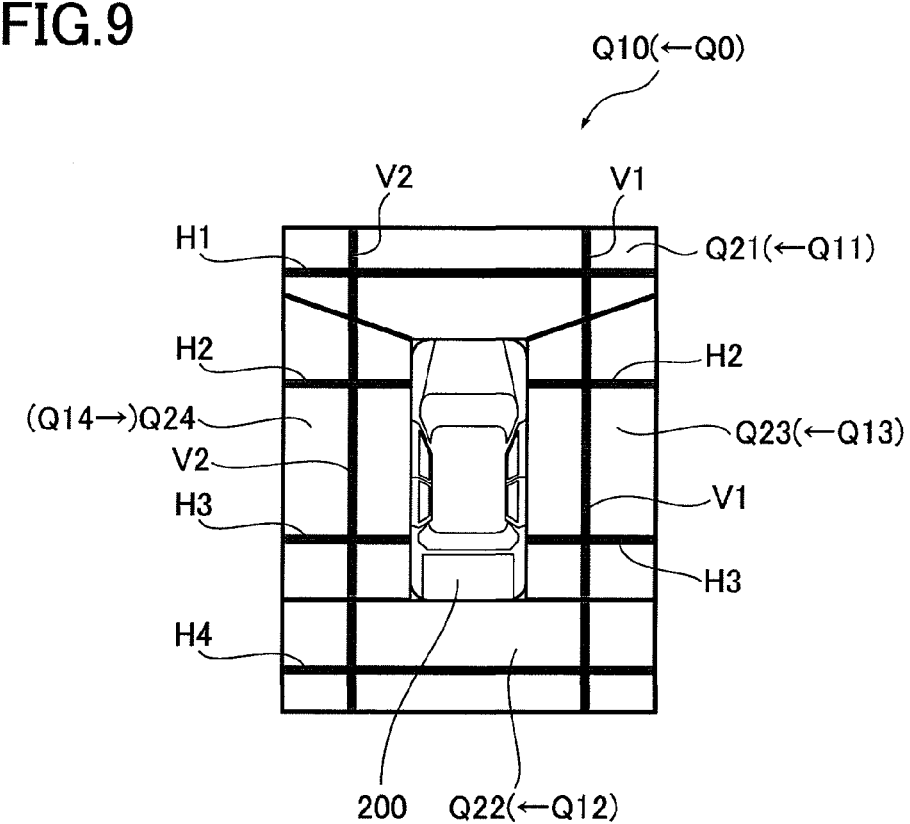
FIG. 9 is a diagram showing a viewpoint-transformed composite image on which the view-point transformation processing is performed in a state where both the internal parameters and the external parameters are corrected.

The correction of each external parameter N performed by the external parameter correction unit 52 is processing in which the images H1, H2, H3, H4, V1, and V2 of the lines H11, H2, H3, H4, V1, and V2 in the calibration index 20 included in the viewpoint-transformed composite image Q0 end up satisfying the conditions of the parallelism (the condition (1)), orthogonality (the condition (3)), the appropriateness of the distance between lines (the condition (2)), and the location on a straight line (the condition (4)) as shown in FIG. 9 by serially changing a value of the external parameter N by trial and error.

That is, the external parameter correction unit 52 corrects the external parameter N to specifically satisfy conditions (1-1) to (1-4) as the above condition (1), to specifically satisfy conditions (3-1) to (3-4) as the above condition (3), to specifically satisfy conditions (2-1) to (2-9) as the above condition (2), and to specifically satisfy conditions (4-1) to (4-4) as the above condition (4).

Specifically, the external parameter correction unit 52 performs the correction to adjust the external parameter N1 corresponding to the front camera 11, the external parameter N2 corresponding to the rear camera 12, the external parameter N3 corresponding to the right-side camera 13, and the external parameter N4 corresponding to the left-side camera 14 so that:

(1-1) the images V1 and V2 respectively corresponding to the two mutually parallel lines V1 and V2 in the viewpoint-transformed partial image Q11 can be parallel to each other;
(1-2) the images V1 and V2 respectively corresponding to the two mutually parallel lines V1 and V2 in the viewpoint-transformed partial image Q12 can be parallel to each other;
(1-3) the images H2 and H3 respectively corresponding to the two mutually parallel lines H2 and H3 in the viewpoint-transformed partial image Q13 can be parallel to each other;
(1-4) the images H2 and H3 respectively corresponding to the two mutually parallel lines H2 and H3 in the viewpoint-transformed partial image Q14 can be parallel to each other;
(3-1) the image H1 corresponding to the one orthogonal line H1 in the viewpoint-transformed partial image Q11 can be orthogonal to the images V1 and V2 respectively corresponding to the two parallel lines V1 and V2;
(3-2) the image H4 corresponding to the one orthogonal line H4 in the viewpoint-transformed partial image Q12 can be orthogonal to the images V1 and V2 respectively corresponding to the two parallel lines V1 and V2;
(3-3) the image V1 corresponding to the one orthogonal line V1 in the viewpoint-transformed partial image Q13 can be orthogonal to the images H2 and H3 respectively corresponding to the two mutually parallel lines H2 and H3;
(3-4) the image V2 corresponding to the one orthogonal line V2 in the viewpoint-transformed partial image Q14 can be orthogonal to the images H2 and H3 respectively corresponding to the two mutually parallel lines H2 and H3;
(2-1) a distance between the images H1 and H2 respectively corresponding to the mutually parallel lines H1 and H2 in each of the two viewpoint-transformed partial images Q11 and Q13 can be the known distance B between the lines H1 and H2 in the actual calibration index 20;
(2-2) a distance between the images H1 and H2 respectively corresponding to the mutually parallel lines H1 and H2 in each of the two viewpoint-transformed partial images Q11 and Q14 can be the known distance B between the lines H1 and H2 in the actual calibration index 20;
(2-3) a distance between the images H4 and H3 respectively corresponding to the mutually parallel lines H4 and H3 in each of the two viewpoint-transformed partial images Q12 and Q13 can be the known distance D between the lines H4 and H3 in the actual calibration index 20;
(2-4) a distance between the images H4 and H3 respectively corresponding to the mutually parallel lines H4 and H3 in each of the two viewpoint-transformed partial images Q12 and Q14 can be the known distance D between the lines H4 and H3 in the actual calibration index 20;

(2-5) a distance between the images H1 and H4 respectively corresponding to the mutually parallel lines H1 and H4 in each of the two viewpoint-transformed partial images Q11 and Q12 can be the known distance E between the lines H1 and H4 in the actual calibration index 20;

(2-6) a distance between the images V1 and V2 respectively corresponding to the mutually parallel lines V1 and V2 in the viewpoint-transformed partial image Q11 can be the known distance A between the lines V1 and V2 in the actual calibration index 20;

(2-7) a distance between the images V1 and V2 respectively corresponding to the mutually parallel lines V1 and V2 in the viewpoint-transformed partial image Q12 can be the known distance A between the lines V1 and V2 in the actual calibration index 20;

(2-8) a distance between the images H2 and H3 respectively corresponding to the mutually parallel lines H2 and H3 in the viewpoint-transformed partial image Q13 can be the known distance C between the lines H2 and H3 in the actual calibration index 20;

(2-9) a distance between the images H2 and H3 respectively corresponding to the mutually parallel lines H2 and H3 in the viewpoint-transformed partial image Q14 can be the known distance C between the lines H2 and H3 in the actual calibration index 20;

(4-1) the image V1 of the line V1 in the viewpoint-transformed partial image Q11, the image V1 of the line V1 in the viewpoint-transformed partial image Q13, and the image V1 of the line V1 in the viewpoint-transformed partial image Q12 can be located on a straight line;

(4-2) the image V2 of the line V2 in the viewpoint-transformed partial image Q11, the image V2 of the line V2 in the viewpoint-transformed partial image Q14, and the image V2 of the line V2 in the viewpoint-transformed partial image Q12 can be located on a straight line;

(4-3) the image H2 of the line H2 in the viewpoint-transformed partial image Q13 and the image H2 of the line H2 in the viewpoint-transformed partial image Q14 can be located on a straight line; and (4-4) the image H3 of the line H3 in the viewpoint-transformed partial image Q13 and the image H3 of the line H3 in the viewpoint-transformed partial image Q14 can be located on a straight line.

Note that the adjustments of the external parameters N by the external parameter correction unit 52 are preferably performed while all of the conditions (1-1) to (1-4), the conditions (3-1) to (3-4), the conditions (2-1) to (2-9), and the conditions (4-1) to (4-4) described above are completely satisfied. However, since not all of the external parameters N can be uniquely obtained in some cases, the external parameters N may also end up substantially satisfying the conditions (1-1) to (1-4), the conditions (3-1) to (3-4), the conditions (2-1) to (2-9), and the conditions (4-1) to (4-4) described above in a good balance.

The external parameters N after ending up satisfying the aforementioned conditions become corrected parameters N. FIG. 9 shows the viewpoint-transformed composite image Q10 newly obtained by performing the viewpoint transformation processing on the distortion-corrected images P11, P12, P13, and P14 by the viewpoint transformation processing unit 40 by use of the corrected external parameters N.

Note that a portion corresponding to the distortion-corrected image P11 in the viewpoint-transformed composite image Q10 is a viewpoint-transformed partial image Q21, a portion corresponding to the distortion-corrected image P12 is a viewpoint-transformed partial image Q22, a portion corresponding to the distortion-corrected image P13 is a viewpoint-transformed partial image Q23, and a portion corresponding to the distortion-corrected image P14 is a viewpoint-transformed partial image Q24.

Note that whether or not images of lines are parallel to each other can be determined in the following manner. Specifically, each of the images of the lines is approximated by using a linear expression in a two-dimensional Cartesian coordinate system using an x axis and a y axis in FIG. 8. Then, it is determined whether or not inclinations (differential values) of the linear expressions are the same.

In addition, whether or not the images of the lines are orthogonal to each other can be determined based on whether or not a value of the product of the inclinations in the aforementioned linear expressions is "−1" (when the images are expressed in vectors, based on whether or not a value of the inner product thereof is "0").

Further, whether or not the images in the viewpoint-transformed composite image Q0 corresponding to the line located on a straight line in the calibration index 20 are located on the straight line can be determined based on whether or not the inclinations of the images coincide with an intercept x (or an intercept y) at the time when the lines are expressed in the two-dimensional Cartesian system defined by the x axis and the y axis (orthogonal to the x axis).

Note that since each of the external parameters N expressed as a single code corresponding to one of the cameras 10 actually consists of position parameters (three variables) for identifying positions in a three-dimensional space and direction parameters (three variables) for identifying directions in the three-dimensional space, each of the external parameters N1, N2, N3, and N4 consists of six variables, and the external parameter correction unit 52 adjusts a total of 24 (=6×4) variables.

As described above, according to the first image calibration device 100 in this embodiment, the internal parameters M are corrected for the distortion-corrected images P obtained by using the default values of the internal parameters M so that the images H and V of the lines H and V in the calibration index 20 in the distortion-corrected images P can form straight lines. Thus, distortion correction appropriate for variation of the optical characteristics and individual differences of the individual cameras 10 can be performed, and distortion-corrected images with high accuracy can be obtained.

Further, by using the new distortion-corrected images (the images H and V of the lines H and V of the calibration index 20 form the straight lines) obtained based on the internal parameters thus corrected, the viewpoint-transformed composite image Q0 based on the default values of the external parameters N is generated. Since the generated viewpoint-transformed composite image Q0 has the high accuracy distortion-corrected images P from which the viewpoint-transformed composite image Q0 is generated, and thus the viewpoint-transformed composite image Q0 necessarily has high accuracy.

Still further, the external parameters N are corrected so that the viewpoint-transformed composite image Q0 can satisfy the aforementioned four conditions (1) to (4), and thereby the viewpoint-transformed composite image Q10 having further higher accuracy can be obtained.

Moreover, the aforementioned four conditions (1) to (4) do not depend on the relative positional relationship between the vehicle 200 and the calibration index 20, and defines by nature the relationship (the parallelism, the orthogonality, the distance between the lines, and the linearity) only among the images H and V of the lines H and V in the viewpoint-transformed composite image Q0. Thus, the strictness of the position of the vehicle 200 or the posture (the direction) of the vehicle 200 with respect to the calibration index 20 at the time of arranging the vehicle 200 with respect to the calibration index 20 is not required.

That is, the relative positional relationship between the calibration index 20 placed on the road surface and the vehicle 200 arranged on the road surface only has to have accuracy (to a degree of practical level of deviation) of the position and the posture of the vehicle 200 obtained in an ordinary operation of parking in a parking frame in a general parking lot or the like. Thus, the degree of strictness required for the relative positional relationship can be alleviated.

This means that even if the vehicle 200 is of a different type (the size or shape of the vehicle), the calibration index 20 common thereto can be used without any modification. Thus, a calibration index 20 dedicated for the type of the vehicle 200 does not have to be prepared and to be placed every time calibration is performed, and labor and time of the work can be considerably reduced.

As described above, according to the image calibration device 100 in this embodiment, the internal parameters M are adjusted so that the images H and V in the distortion-corrected images P which correspond to the lines H and V in the calibration index 20 can extend linearly. Thereby, it is possible to achieve higher calibration than the conventional calibration in which the fixed internal parameter is used and the external parameter N is adjusted.

In addition, according to the image calibration device 100 in this embodiment, the calibration index 20 is formed by the lines in comparison with the conventional calibration method performed only based on points. Thus, the accuracy can be improved more than in the conventional calibration in which distortions between the points are not considered.

Besides, at least two lines parallel to each other and having a known distance between the lines and at least one line orthogonal to the two lines are applied to the lines H and V, and thereby the external parameters N are adjusted based on the degree of parallelism and the degree of orthogonality of the images H and V in the viewpoint-transformed composite image Q0, based on the distance between the images (the lines), and so that the images H and V corresponding to the lines H and V which are overlappingly shown in the at least two viewpoint-transformed partial images and located on a straight line can be located on the straight line. Thus, highly accurate calibration can be performed all over the viewpoint-transformed composite image Q0.

Moreover, in the image calibration device 100 in this embodiment, a simple calibration index is applied to the calibration index 20. The simple calibration index is constituted of: the first horizontal line H1, the second horizontal line H2, the third horizontal line H3, and the fourth horizontal line H4 which extend in the vehicle width direction, are parallel to each other, and have straight line shapes; and the vertical lines V1 and V2 which are orthogonal to each of the horizontal lines H1, H2, H3, and H4. The calibration index has known distances between the lines. The calibration index 20 in such a simple configuration is easily available, and can be drawn easily even though the calibration index 20 needs to be formed by being drawn on the road surface. Thus, easy handling can be achieved.

Further, in the calibration device 100 in this embodiment is a device in which, by repeating a computation based on the aforementioned conditions (1) to (4), the external parameter correction unit 52 corrects the external parameters N so that the viewpoint-transformed composite image Q0 can end up with the new viewpoint-transformed composite image Q10. However, the image calibration device of the present invention is not limited to one in this embodiment, and may be one in which the external parameter correction unit 52 performs the correction to adjust the external parameters N by adding a condition (5) (images of reliable lines are identified by using the default values of the external parameters) to the aforementioned conditions (1) to (4).

As described above, the images of the reliable lines are identified by using not only the aforementioned conditions (1) to (4) but also the default values of the external parameters. Thereby, the number of computations repeated so that the viewpoint-transformed composite image Q0 can end up with the new viewpoint-transformed composite image Q10 can be reduced, and thus an elapse of time until the end-up can be reduced.

Embodiment 2

FIG. 11 is a block diagram showing a configuration of an image calibration device 100 of a second embodiment of the present invention.

The calibration device 100 illustrated therein is different from the calibration device 100 in Embodiment 1 shown in FIG. 1 in a point that the internal parameter correction unit 51 of the calibration unit 50 performs correction to adjust the internal parameters M so that images of two mutually parallel lines and an image corresponding to one line orthogonal to the two mutually parallel lines in each of viewpoint-transformed partial images in a viewpoint-transformed composite image Q can extend linearly, the viewpoint-transformed composite image Q being subjected to viewpoint transformation processing based on the four distortion-corrected images P1 to P4 (distortion-corrected images obtained by distortion correction based on the internal parameters (default internal parameters) before being corrected). The other configuration of the calibration device 100 is the same as that of the calibration device 100 in Embodiment 1, and thus a description thereof will be omitted.

Besides, an operation and an effect are also the same as those of the calibration device 100 in Embodiment 1 except those to be particularly described later, and thus a description thereof will be omitted.

In the calibration device 100 in Embodiment 1, when the internal parameter correction unit 51 corrects the internal parameters, target images for adjusting the linearity of images of lines of the calibration index 20 are the distortion-corrected images P1 to P4 (distortion-corrected images obtained by distortion correction using the default internal parameters, see FIG. 6). In contrast in the calibration device 100 in Embodiment 2, target images are the four viewpoint-transformed partial images Q21 to Q24 forming a viewpoint-transformed composite image Q20 (the viewpoint-transformed composite image obtained by performing the viewpoint transformation processing using the default external parameters on the four distortion-corrected images P1 to P4 obtained by the distortion correction using the default internal parameters, see FIG. 12).

Figure 12:
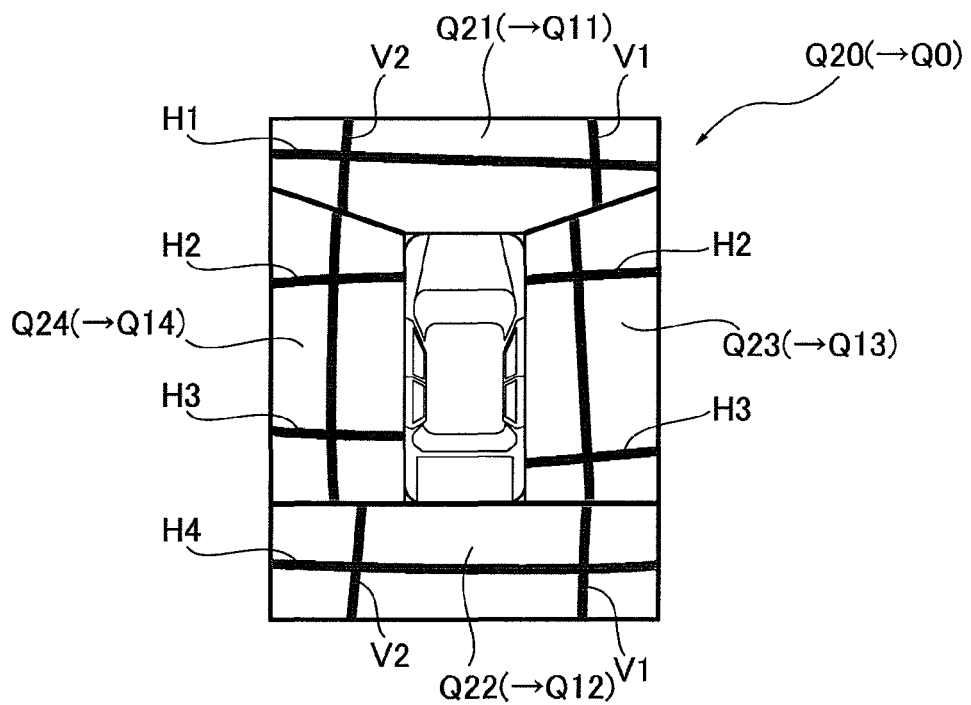
FIG. 12 is a diagram showing a viewpoint-transformed composite image on which calibration processing is performed in a state where default internal and external parameters are applied thereto.

In addition, in the calibration device 100 in Embodiment 2, for each of the viewpoint-transformed partial images Q21 to Q24 shown in FIG. 12, the internal parameter correction unit 51 performs a correction to adjust a corresponding one of the internal parameters M so that images corresponding to mutually parallel lines and an image corresponding to one line orthogonal to the mutually parallel lines can extend linearly, the images being included in the corresponding one of the viewpoint-transformed partial images Q21 to Q24. Then, the internal parameter correction unit 51 feeds back the corrected internal parameter M to the distortion correction processing unit 30. The distortion correction processing unit 30 performs a distortion correction on a corresponding one of the peripheral area images S1 to S4 based on the corrected internal parameter M. Thereby, distortion-corrected images P11 to P14 can consequently be obtained as in the calibration device 100 in Embodiment 1. The distortion-corrected images P11 to P14 are inputted in the viewpoint transformation processing unit 40, and then the viewpoint transformation processing unit 40 performs the viewpoint transformation processing on the inputted distortion-corrected images P11 to P14 by using the default external parameters N. Thereby, a new viewpoint-transformed composite image (hereinafter, referred to as a viewpoint-transformed composite image Q0) is consequently obtained, the viewpoint-transformed composite image Q0 being substantially the same as the new viewpoint-transformed composite image Q0 (see FIG. 8) obtained by the calibration device 100 in Embodiment 1.

Thereafter, the external parameter correction unit 52 performs correction to adjust the external parameters N according to the same operation as that by the external parameter correction unit 52 in the calibration device 100 in Embodiment 1 so that the viewpoint-transformed composite image Q0 can satisfy the conditions (1-1) to (1-4), the conditions (3-1) to (3-4), the conditions (2-1) to (2-9), and the conditions (4-1) to (4-4). The viewpoint transformation processing unit 40 repeats a computation by using the corrected external parameters N, and thereby the viewpoint-transformed composite image Q10 shown in FIG. 9 is obtained.

As the result of this, the image calibration device 100 in Embodiment 2 can also provide the same effect as that of the image calibration device 100 in Embodiment 1.

Meanwhile, the calibration device 100 in Embodiment 2 corrects the internal parameters M for the viewpoint-transformed composite image Q so that images of lines therein can form straight lines, while the calibration device 100 in Embodiment 1 corrects the internal parameters M for each of the distortion-corrected images P so that the images of the lines therein can form straight lines.

Note that it can be said that a longer image of a line results in higher accuracy reliability in correcting the image of the line to obtain a straight line.

In this respect, since the images of the lines in each of the distortion-corrected images P are longer than the images of the lines in the viewpoint-transformed composite image Q, the accuracy reliability is higher in correcting each internal parameter M so that the images of the lines in the distortion-corrected images P can form straight lines than in the case of correcting each internal parameter M so that the images of the lines in the viewpoint-transformed composite image Q can form straight lines.

Therefore, the image calibration device 100 in Embodiment 1 can provide calibration having higher reliability on the accuracy than the image calibration device 100 in Embodiment 2.

In the embodiments described above, the calibration index 20 is constituted of the four mutually parallel horizontal lines H1 to H4 (the lines extending in the width direction of the vehicle 200) and the two mutually parallel vertical lines V1 and V2 (the lines extending in the front-rear direction of the vehicle 200) all of which are shown in FIG. 3, and the two outermost horizontal lines H1 and H4 and the two vertical lines V1 and V2 are located outside the vehicle 200. However, the image calibration device according to the present invention is not limited to those in these embodiments. For example, an image calibration device shown in FIG. 13A, one shown in FIG. 14A, and the like can also be applied thereto.

In other words, the image calibration device according to the present invention only has to be one: in which each of the peripheral area images S1 to S4 taken by a corresponding one of the cameras 10 includes at least images corresponding to two mutually parallel lines and an image corresponding to one line orthogonal to each of the two lines; and in which among the lines included in the calibration index 20, at least one line located within a shooting range of one of the cameras 10 and at least one line located within a shooting range of a different one of the cameras 10 are formed to be located on a straight line. Thus, even a calibration index in a form of omitting one or both of the horizontal line H2 and the horizontal line H3 can form the image calibration device according to the present invention. However, this depends on an installation state (a front-rear direction location in the front-rear direction of the vehicle or a direction of an optical axis) of the right-side camera 13 or the left-side camera 14.

Figure 13A:
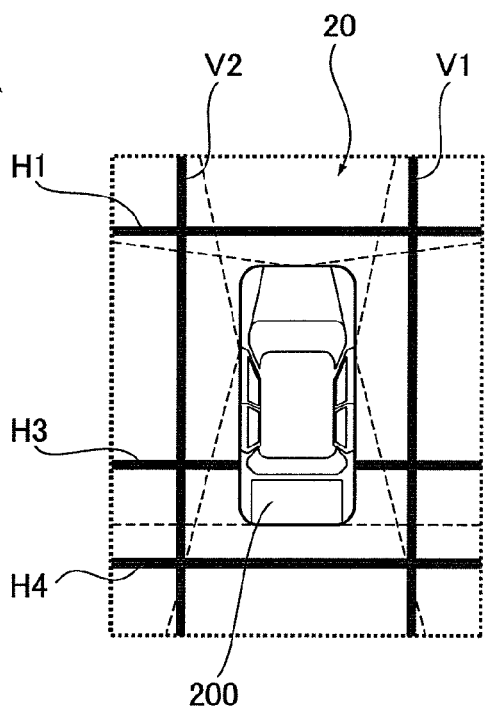
FIG. 13A exemplifies a case (Case 1) of application of a calibration index of a different embodiment, and is a diagram showing an applicable calibration index in the same state of FIG. 5.

The calibration index 20 in FIG. 13A includes at least: a horizontal line (a first line) H1, a horizontal line (a second line) H4, a horizontal line (a sixth line) H3 (or a horizontal line H2 (a fifth line) instead of the horizontal line H3 (the sixth line)), a vertical line (a third line) V1, and a vertical line (a fourth line) V2 all of which are straight lines, the horizontal line H1 being placed in front of the vehicle 200 and extending in the vehicle width direction, the horizontal line H4 being placed behind the vehicle 200 and extending in the vehicle width direction, the horizontal line H3 (or the horizontal line H2) being placed between the horizontal line H1 and the horizontal line H4 and extending in the vehicle width direction, the vertical line V1 and the vertical line V2 being placed at both sides of the vehicle 200 and extending in the front-rear direction of the vehicle 200.

Note that a distance between the mutually parallel lines H1 and H4, a distance between the mutually parallel lines H1 and H3, and a distance between the mutually parallel lines V1 and V2 are also known as in the aforementioned embodiments.

According to the image calibration device 100 including the calibration index 20 configured as shown in this FIG. 13A, the same operation and effect as those of the image calibration device 100 including the calibration index 20 shown in FIG. 3 can be obtained in the following manner. Specifically, processing (ensuring the linearity (correcting the internal parameters M in distortion correction) of the image H1 of the horizontal line H1, ensuring the parallelism with the different horizontal lines H3, H4 and the like, and ensuring the distances or the like between the vertical lines V1 and V2 and between the horizontal line H1 and the different horizontal lines H3 and H4 (correcting the external parameters N in the viewpoint transformation processing)) which should be performed on the image H1 of the horizontal line H1 in the calibration index 20 shown in FIG. 13A is made also serve as processing which should be performed on the image H2 of the horizontal line H2 in the calibration index 20 shown in FIG. 3. The processing which should be performed on the image H2 of the horizontal line H2 is ensuring the linearity (correcting the internal parameters M in the distortion correction) of the image H2 of the horizontal line H2, ensuring the parallelism with the different horizontal lines H3, H4 and the like, and ensuring the distances or the like between the vertical lines V1 and V2 and between the horizontal line H2 and the different horizontal lines H3 and H4 (correcting the external parameters N in the viewpoint transformation processing).

Figure 13B:
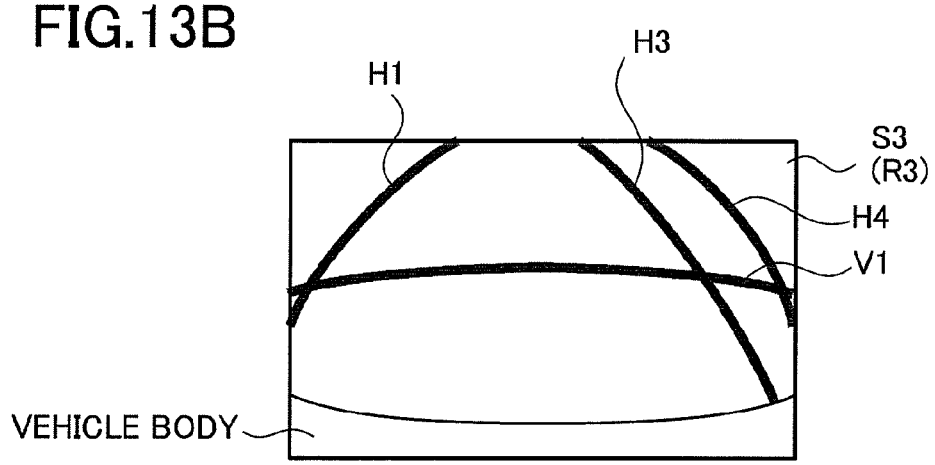
FIG. 13B exemplifies the case (Case 1) of application of the calibration index of the different embodiment, and is a peripheral area image shown by a right side mirror in the case of application of the calibration index in FIG. 13A.
Figure 13C:
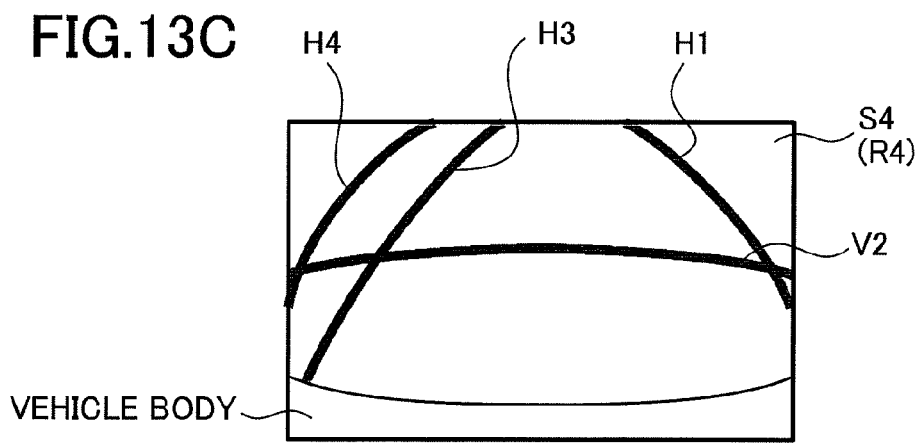
FIG. 13C exemplifies the case (Case 1) of application of the calibration index of the different embodiment, and is a peripheral area image shown by a left side mirror in the case of application of the calibration index in FIG. 13A.

Note that in the image calibration device 100 including the calibration index 20 configured as shown in FIG. 13A, the peripheral area image S3 taken by the right-side camera 13 corresponding to FIG. 4C is one as shown in FIG. 13B, and the peripheral area image S4 taken by the left-side camera 14 corresponding to FIG. 4D is one as shown in FIG. 13C.

Figure 14A:
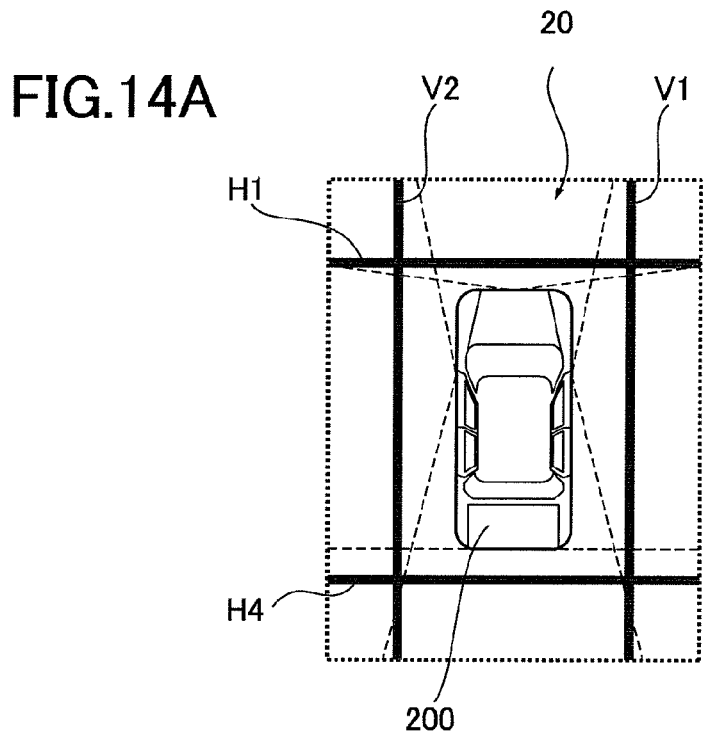
FIG. 14A exemplifies a case (Case 2) of application of a calibration index of a different embodiment, and is a diagram showing an applicable calibration index in the same state of FIG. 5.

The calibration index 20 in FIG. 14A includes at least a horizontal line (a first line) H1, a horizontal line (a second line) H4, a vertical line (a third line) V1, and a vertical line (a fourth line) V2 all of which are straight lines, the horizontal line H1 being placed in front of the vehicle 200 and extending in the vehicle width direction, the horizontal line H4 being placed behind the vehicle 200 and extending in the vehicle width direction, the vertical line V1 and the vertical line V2 being placed at both sides of the vehicle 200 and extending in the front-rear direction of the vehicle 200.

Note that a distance between the mutually parallel lines H1 and H4, and a distance between the mutually parallel lines V1 and V2 are also known as in the aforementioned embodiments.

According to the image calibration device 100 including the calibration index 20 configured as shown in this FIG. 14A, the same operation and effect as those of the image calibration device 100 including the calibration index 20 shown in FIG. 13A can be obtained in the following manner. Specifically, the processing (ensuring the linearity (correcting the internal parameters M in distortion correction) of the image H1 of the horizontal line H1, ensuring the parallelism with the different horizontal line H4 and the like, and ensuring the distances or the like between the vertical lines V1 and V2 and between the horizontal line H1 and the different horizontal line H4 (correcting the external parameters N in the viewpoint transformation processing)) which should be performed on the image H1 of the horizontal line H1 in the calibration index 20 shown in FIG. 14A is made also serve as processing which should be performed on the image H3 of the horizontal line H3 in the calibration index 20 shown in FIG. 13A. The processing which should be performed on the image H3 of the horizontal line H3 is ensuring the linearity (correcting the internal parameters M in the distortion correction) of the image H3 of the horizontal line H3, ensuring the parallelism with the different horizontal line H4 and the like, and ensuring the distances or the like between the vertical lines V1 and V2 and between the horizontal line H3 and the different horizontal line H4 (correcting the external parameters N in the viewpoint transformation processing).

Figure 14B:
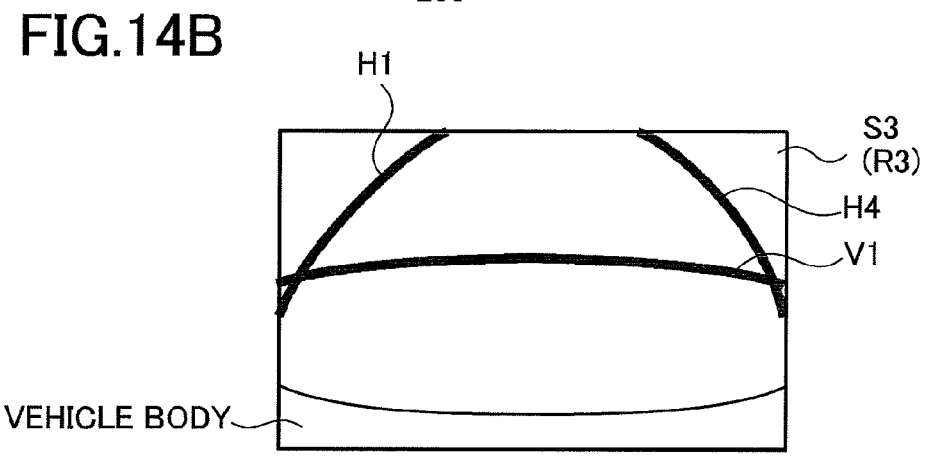
FIG. 14B exemplifies the case (Case 2) of application of the calibration index of the different embodiment, and is a peripheral area image shown by a right side mirror in the case of application of the calibration index FIG. 14A.
Figure 14C:
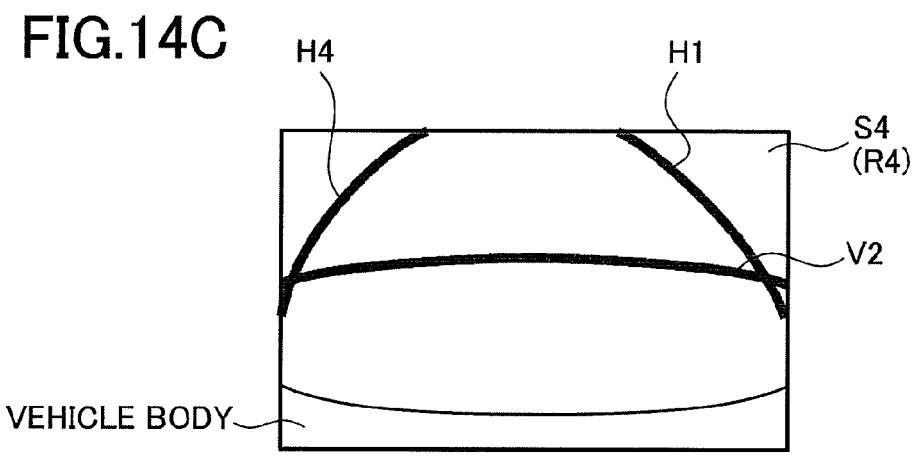
FIG. 14C exemplifies the case (Case 2) of application of the calibration index of the different embodiment, and is a peripheral area image shown by a left side mirror in the case of application of the calibration index FIG. 14A.

Note that in the image calibration device 100 including the calibration index 20 configured as shown in FIG. 14A, the peripheral area image S3 taken by the right-side camera 13 corresponding to FIG. 4C is one as shown in FIG. 14B, and the peripheral area image S4 taken by the left-side camera 14 corresponding to FIG. 4D is one as shown in FIG. 14C.

In the aforementioned calibration index 20 shown in FIG. 14A, the images H1 and H4 of the horizontal lines H1 and H4 shown in the peripheral area images S3 and S4 (FIG. 14B and FIG. 14C) are shorter than the images H2 and H3 of the horizontal lines H2 and H3 shown in the peripheral area images S3 and S4 shown in FIG. 4C and FIG. 4D. Thus, the accuracy of the correction of the internal parameters M made by ensuring the linearity is higher in the calibration device 100 using the calibration index 20 shown in FIG. 3.

It should be noted that the aforementioned calibration device 100 in each embodiment has been described as that in an embodiment of the image calibration device according to the present invention, and the operation of the calibration device 100 can be regarded as that in an embodiment of an image calibration method according to the present invention.

CROSS-REFERENCE TO RELATED APPLICATIONS

This application is based upon and claims the benefit of priority from the prior Japanese Patent Application No. 2010-147128, filed on Jun. 29, 2010, the entire contents of which are incorporated herein by reference.

The invention claimed is:

1. An image calibration method including:

taking peripheral area images of peripheral areas of a vehicle respectively with a plurality of cameras installed on the vehicle, the peripheral areas including a calibration index provided in advance on a road surface on which the vehicle is arranged, performing distortion correction on the peripheral area images respectively taken by the cameras on the basis of internal parameters according to optical characteristics of the cameras, performing viewpoint transformation processing on a plurality of distortion-corrected images obtained by the distortion correction on the basis of external parameters according to states of attachment of the cameras to the vehicle, the viewpoint transformation processing being performed so that the plurality of distortion-corrected images are processed into a single viewpoint-transformed composite image obtained when the vehicle is looked down from above the vehicle, and calibrating the viewpoint-transformed composite image by adjusting the external parameters on the basis of an image of the calibration index in the viewpoint-transformed composite image, in the viewpoint transformation processing, the image calibration method characterized in that the calibration index includes at least two lines which are mutually parallel and a distance between which is known and at least one line orthogonal to each of the two lines, and is formed so that each of the peripheral area images includes at least images corresponding to the two mutually parallel lines and an image corresponding to the one line orthogonal to each of the two lines and so that among the lines included in the calibration index, at least one line located in a shooting range of one of the cameras and at least one line located in a shooting range of a different one of the cameras are located on a straight line, for each of the plurality of distortion-corrected images, or viewpoint-transformed composite image, correction of adjusting the internal parameters is performed so that images corresponding to the two mutually parallel lines and an image corresponding to the one orthogonal line included in the distortion-corrected image, or the viewpoint-transformed composite image extend linearly, a new viewpoint-transformed composite image is obtained by using new distortion-corrected images obtained by using the corrected internal parameters, and the correction of adjusting the external parameters is performed so that the new viewpoint-transformed composite image thus obtained satisfies the following conditions (1) to (4):

(1) the images corresponding to the two mutually parallel lines are mutually parallel;

(2) a distance between the images corresponding to the two mutually parallel lines is the known distance between the lines in the calibration index;

(3) the image corresponding to the one orthogonal line is orthogonal to the images corresponding to the two parallel lines; and (4) images corresponding to the line located on the straight line in the calibration index are located on a straight line.

2. The image calibration method according to claim 1, characterized in that the correction of adjusting the external parameters is performed so as to satisfy the following condition (5) in addition to the conditions (1) to (4):

(5) images of reliable lines are identified by using default values of the external parameters.

3. The image calibration method according to claim 1, characterized in that the calibration index includes at least a first line, a second line, a third line, a fourth line, a fifth line, and a sixth line all of which are straight lines, the first line being placed in front of the vehicle and extending in a vehicle width direction, the second line being placed behind the vehicle and extending in the vehicle width direction, the third line and the fourth line being placed between the first line and the second line and extending in the vehicle width direction, the fifth line and the sixth line being placed at both sides of the vehicle and extending in a vehicle front-rear direction.

4. The image calibration method according to claim 1, characterized in that the calibration index includes at least a first line, a second line, a fifth line, a third line, and a fourth line all of which are straight lines, the first line being placed in front of the vehicle and extending in a vehicle width direction, the second line being placed behind the vehicle and extending in the vehicle width direction, the fifth line being placed between the first line and the second line and extending in the vehicle width direction, the third line and the fourth line being placed at both sides of the vehicle and extending in a vehicle front-rear direction.

5. The image calibration method according to claim 1, characterized in that the calibration index includes at least a first line, a second line, a third line, and a fourth line all of which are straight lines, the first line being placed in front of the vehicle and extending in a vehicle width direction, the second line being placed behind the vehicle and extending in the vehicle width direction, the third line and the fourth line being placed at both sides of the vehicle and extending in a vehicle front-rear direction.

6. An image calibration device including
a calibration index provided in advance on a road surface on which a vehicle is arranged,
a plurality of cameras installed on the vehicle which take peripheral area images of peripheral areas of the vehicle, the peripheral areas including the calibration index,
a distortion correction device for performing distortion correction on the peripheral area images respectively taken by the cameras, on the basis of internal parameters according to optical characteristics of the cameras,
a viewpoint transformation processing device for performing viewpoint transformation processing on a plurality of distortion-corrected images obtained by the distortion correction on the basis of external parameters according to states of attachment of the cameras to the vehicle, the viewpoint transformation processing being performed so that the plurality of distortion-corrected images are processed into a single viewpoint-transformed composite image obtained when being looked down from above the vehicle, and
a calibration device for calibrating the viewpoint-transformed composite image by adjusting the external parameters on the basis of images of the calibration index in the viewpoint-transformed composite image, in the viewpoint transformation processing performed by the viewpoint transformation processing device, the image calibration device characterized in that
the calibration index comprises at least two lines which are mutually parallel and a distance between which is known and at least one line orthogonal to each of the two lines, and is formed so that each of the peripheral area images includes at least images corresponding to the two mutually parallel lines and an image corresponding to the one line orthogonal to each of the two lines, and so that among the lines included in the calibration index, at least one line located in a shooting range of one of the cameras and at least one line located in a shooting range of a different one of the cameras are located on a straight line, and
the calibration device comprises
an internal parameter correction device for performing correction of adjusting the internal parameters for a corresponding one of the plurality of distortion-corrected images, or the viewpoint-transformed composite image so that images corresponding to the two mutually parallel lines and an image corresponding to the one orthogonal line included in the distortion-corrected image, or the viewpoint-transformed composite image extend linearly, and
an external parameter correction device for, when a new viewpoint-transformed composite image is obtained by using new distortion-corrected images obtained by the distortion correction device by using the corrected internal parameters, performing correction of adjusting the external parameters so that the new viewpoint-transformed composite image thus obtained satisfies the following conditions (1) to (4):

(1) the images corresponding to the two mutually parallel lines are mutually parallel;
(2) a distance between the images corresponding to the two mutually parallel lines is the known distance between the lines in the calibration index;
(3) the image corresponding to the one orthogonal line is orthogonal to the images corresponding to the two parallel lines; and
(4) images corresponding to the line located on the straight line in the calibration index are located on a straight line.

7. The image calibration device according to claim 6, the image calibration device characterized in that the external parameter correction device performs correction of adjusting the external parameters so as to satisfy the following condition (5) in addition to the conditions (1) to (4):

(5) images of reliable lines are identified by using default values of the external parameters.

8. The image calibration device according to claim 6, the image calibration device characterized in that the calibration index includes at least a first line, a second line, a third line, a fourth line, a fifth line, and a sixth line all of which are straight lines, the first line being placed in front of the vehicle and extending in a vehicle width direction, the second line being placed behind the vehicle and extending in the vehicle width direction, the third line and the fourth line being placed between the first line and the second line and extending in the vehicle width direction, the fifth line and the sixth line being placed at both sides of the vehicle and extending in a vehicle front-rear direction.

9. The image calibration device according to claim 6, the image calibration device characterized in that the calibration index includes at least a first line, a second line, a fifth line, a third line, and a fourth line all of which are straight lines, the first line being placed in front of the vehicle and extending in a vehicle width direction, the second line being placed behind the vehicle and extending in the vehicle width direction, the fifth line being placed between the first line and the second line and extending in the vehicle width direction, the third line and the fourth line being placed at both sides of the vehicle and extending in a vehicle front-rear direction.

10. The image calibration device according to claim 6, the image calibration device characterized in that the calibration index includes at least a first line, a second line, a third line, and a fourth line all of which are straight lines, the first line being placed in front of the vehicle and extending in a vehicle width direction, the second line being placed behind the vehicle and extending in the vehicle width direction, the third line and the fourth line being placed at both sides of the vehicle and extending in a vehicle front-rear direction.

* * * * *